US012627453B2

(12) United States Patent
Zhang et al.

(10) Patent No.: US 12,627,453 B2
(45) Date of Patent: May 12, 2026

(54) METHOD AND CORRESPONDING DEVICE FOR UPLINK TRANSMISSION

(71) Applicant: Samsung Electronics Co., Ltd., Suwon-si (KR)

(72) Inventors: Sa Zhang, Beijing (CN); Yi Wang, Beijing (CN); Feifei Sun, Beijing (CN); Jingxing Fu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 278 days.

(21) Appl. No.: 18/032,947

(22) PCT Filed: Oct. 20, 2021

(86) PCT No.: PCT/KR2021/014756
§ 371 (c)(1),
(2) Date: Apr. 20, 2023

(87) PCT Pub. No.: WO2022/086189
PCT Pub. Date: Apr. 28, 2022

(65) Prior Publication Data
US 2023/0396391 A1 Dec. 7, 2023

(30) Foreign Application Priority Data

| | | | |
|---|---|---|---|
| Oct. 20, 2020 | (CN) | .......................... | 202011127034.9 |
| Jan. 19, 2021 | (CN) | .......................... | 202110069874.2 |
| Apr. 2, 2021 | (CN) | .......................... | 202110363835.3 |

(51) Int. Cl.
*H04L 5/00* (2006.01)
*H04L 1/1829* (2023.01)
(Continued)

(52) U.S. Cl.
CPC .......... *H04L 5/0055* (2013.01); *H04L 1/1854* (2013.01); *H04L 5/14* (2013.01); *H04W 72/11* (2023.01); *H04W 72/21* (2023.01)

(58) Field of Classification Search
CPC ... H04L 1/1854; H04L 1/1822; H04L 5/0055; H04L 5/14; H04L 5/0094; H04L 5/1469;
(Continued)

(56) References Cited

U.S. PATENT DOCUMENTS

2019/0082454 A1 3/2019 Shi et al.
2022/0399978 A1* 12/2022 Gao ...................... H04L 5/0055
(Continued)

FOREIGN PATENT DOCUMENTS

IN 2020-37020266 A 7/2020
WO 2020/204526 A1 10/2020

OTHER PUBLICATIONS

Moderator (Nokia), Feature lead summary #1 on Rel-17 HARQ-ACK feedback enhancements for NR Rel-17 URLLC/IIoT (AI 8.3.1.1), R1-2007059, 3GPP TSG-RAN WG1 Meeting #102-e, e-Meeting, Aug. 19, 2020, XP052348427.
(Continued)

*Primary Examiner* — Brian D Nguyen
(74) *Attorney, Agent, or Firm* — Jefferson IP Law, LLP

(57) ABSTRACT

The disclosure relates to a communication method and system for converging a 5th-Generation (5G) communication system for supporting higher data rates beyond a 4th-Generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services The disclosure provides a user equipment (UE) in a wireless
(Continued)

communication system and a method performed by the UE, including: receiving downlink data and/or downlink control signaling from a base station; and transmitting uplink data and/or uplink control signaling to the base station based on the downlink data and/or downlink control signaling received from the base station.

16 Claims, 3 Drawing Sheets

(51) Int. Cl.
  *H04L 5/14*       (2006.01)
  *H04W 72/11*      (2023.01)
  *H04W 72/21*      (2023.01)

(58) Field of Classification Search
  CPC .... H04L 5/0053; H04L 5/0044; H04W 72/11; H04W 72/21
  See application file for complete search history.

(56)                References Cited

U.S. PATENT DOCUMENTS

| | | | |
|---|---|---|---|
| 2023/0155744 A1* | 5/2023 | Bae | H04L 1/1864 370/280 |
| 2023/0189244 A1* | 6/2023 | Xu | H04W 72/12 370/329 |
| 2023/0276459 A1* | 8/2023 | Ouchi | H04L 1/1854 370/329 |
| 2023/0345472 A1* | 10/2023 | Takahashi | H04W 72/21 |
| 2023/0379966 A1* | 11/2023 | Nogami | H04W 72/231 |

OTHER PUBLICATIONS

Moderator (Nokia), Feature lead summary #4 on HARQ-ACK feedback enhancements for NR Rel-17 URLLC/IIoT (AI 8.3.1.1), R1-2007354, 3GPP TSG-RAN WG1 Meeting #102-e, e-Meeting, Aug. 31, 2020, XP052348722.
Moderator (Nokia), Feature lead summary #4 on HARQ-ACK feedback enhancements for NR Rel-17 URLLC/IIoT (AI 8.3.1.1), R1-2007354, 3GPP TSG-RAN WG1 Meeting #102-e, e-Meeting, Aug. 31, 2020, XP051926070.
Qualcomm Incorporated, HARQ-ACK enhancement for IOT and URLLC, R1-2107336, 3GPP TSG RAN WG1 #106-e, e-Meeting, Aug. 7, 2021, XP052038288.
NTT Docomo, Inc., et al., Discussion on HARQ-ACK feedback enhancements for Rel. 17 URLLC, RI-2107851, 3GPP TSG RAN Wgi #106-e, e-Meeting, Aug. 6, 2021, XP052033648.
Extended European Search Report dated Mar. 12, 2024, issued in European Patent Application No. 21883257.4.
CMCC, 'Discussion on DL SPS enhancements', R1-1912541, 3GPP TSG RAN WG1 Meeting #99, Reno, USA, Nov. 9, 2019.
VIVO, 'HARQ-ACK enhancements for Rel-17 URLLC', R1-2005374, 3GPP TSG-RAN WG1#102-e, e-Meeting, Aug. 3, 2020.
ZTE, 'Discussion on HARQ-ACK enhancements for eURLLC', R1-2005431, 3GPP TSG-RAN WG1 Meeting #102-e, e-Meeting, Aug. 8, 2020.
3GPP TS 38.213 V16.2.0, 3rd Generation Partnership Project; Technical Specification Group Radio Access Network; NR; Physical layer procedures for control, (Release 16), Jul. 20, 2020.
LG Electronics; Summary#2 of 7.2.6.7 Others; 3GPP TSG RAN WG1 #99; R1-1913451; Reno, USA; Nov. 18-22, 2019; Nov. 26, 2019.
Nokia; Feature lead summary #3 on HARQ-ACK feedback enhancements for NR Rel-17 URLLC/IIoT (AI 8.3.1.1); 3GPP TSG-RAN WG1 Meeting #102-e; R1-2007216; e-Meeting; Aug. 17-28, 2020; Aug. 26, 2020.
Intel Corporation; UE HARQ feedback enhancements in Release 17 URLLC/IIoT; 3GPP TSG RAN WG1 #102-e; R1-2005869; e-Meeting; Aug. 17-28, 2020; Aug. 8, 2020.
Chinese Office Action with English translation dated Jul. 30, 2025; Chinese Appln. No. 202110870986.8.
Chinese Office Action with English translation dated Dec. 18, 2025; Chinese Appln. No. 202110870986.8.

* cited by examiner

[Fig. 1]
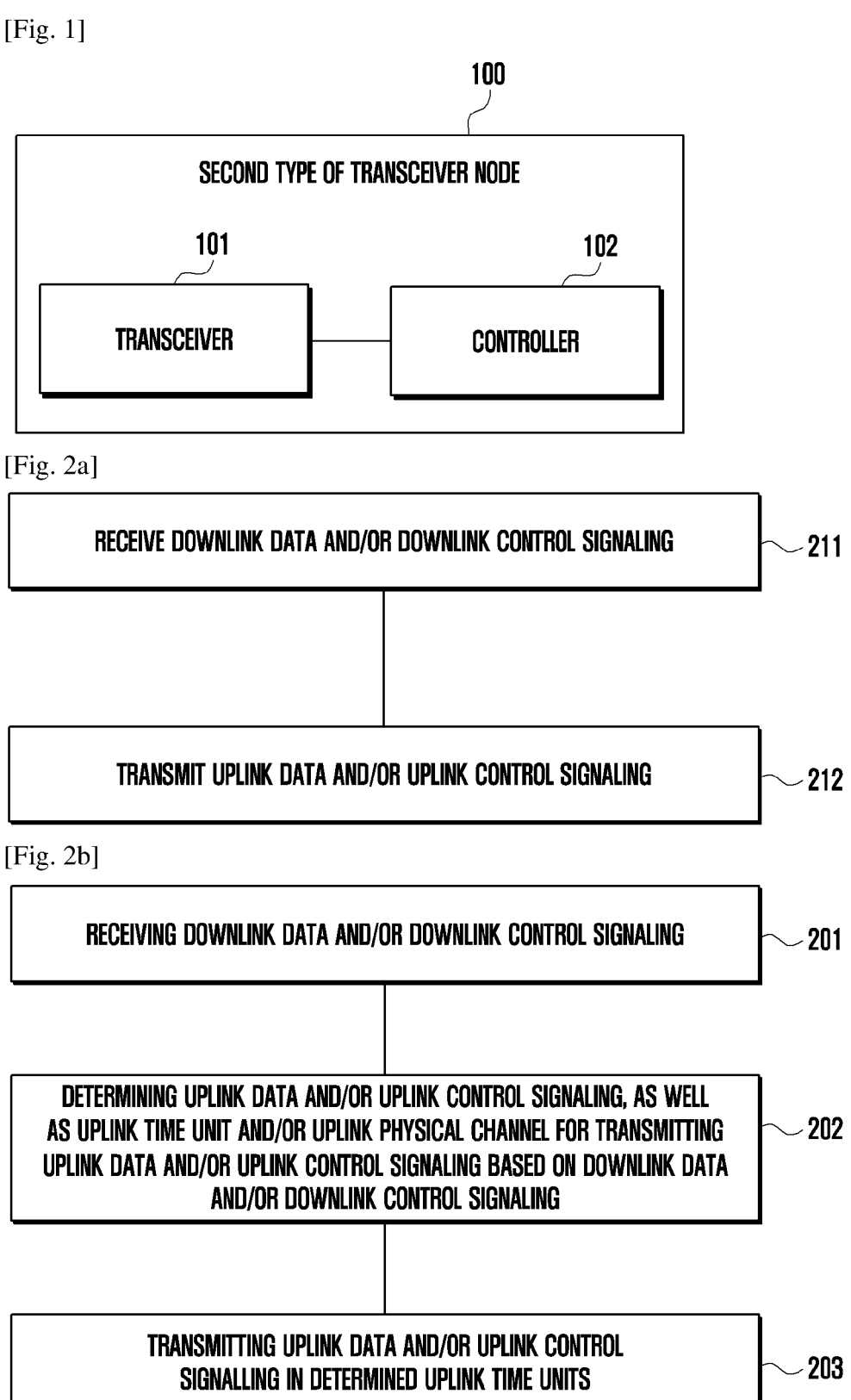
[Fig. 2a]
[Fig. 2b]

[Fig. 3]

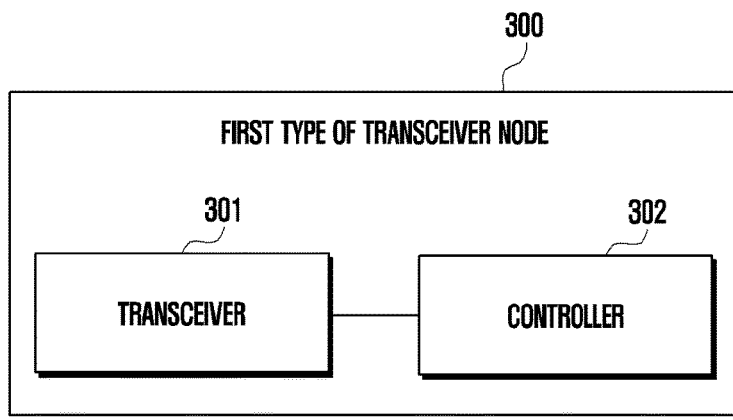

300

FIRST TYPE OF TRANSCEIVER NODE

301

TRANSCEIVER

302

CONTROLLER

[Fig. 4a]

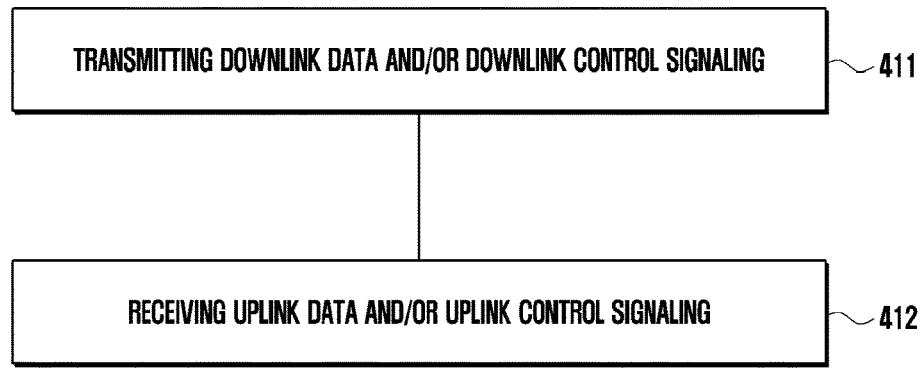

TRANSMITTING DOWNLINK DATA AND/OR DOWNLINK CONTROL SIGNALING — 411

RECEIVING UPLINK DATA AND/OR UPLINK CONTROL SIGNALING — 412

[Fig. 4b]

TRANSMITTING DOWNLINK DATA AND/OR DOWNLINK CONTROL SIGNALING — 401

RECEIVING SECOND TYPE OF DATA AND/OR SECOND TYPE OF CONTROL SIGNALING IN UPLINK TIME UNIT, WHERE SECOND TYPE OF DATA AND/OR SECOND TYPE OF CONTROL SIGNALING AND UPLINK TIME UNIT ARE DETERMINED BY UE BASED ON RECEIVED DOWNLINK DATA AND/OR DOWNLINK CONTROL SIGNALING — 402

[Fig. 5a]

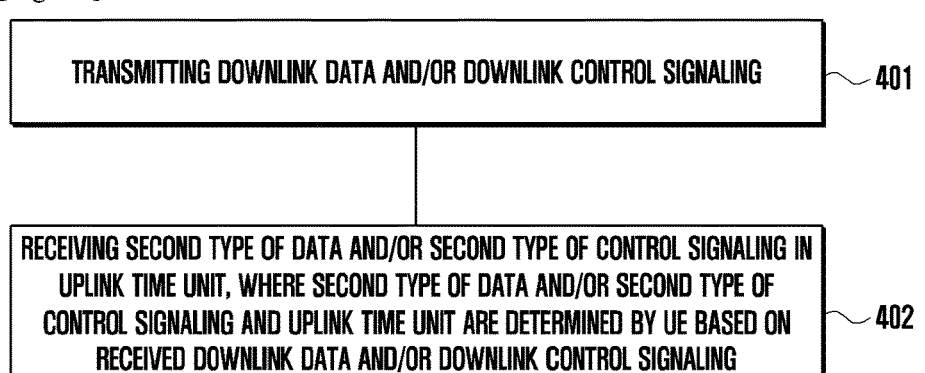

K0 [K0=1]      K1 [K1=3]

TIME UNIT   DCI    PDSCH          PUCCH

[Fig. 5b]

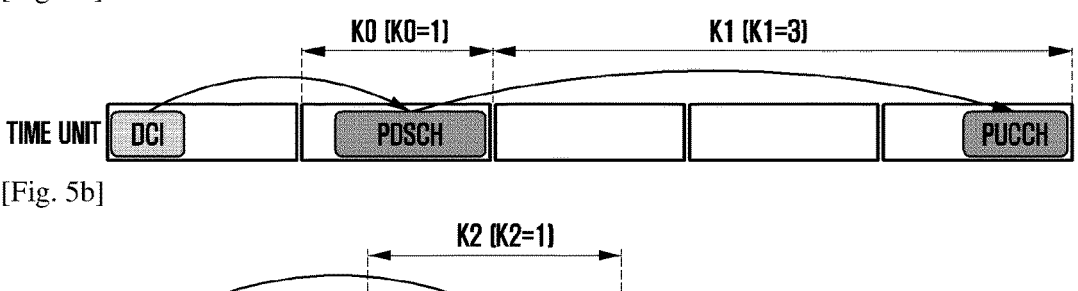

K2 [K2=1]

TIME UNIT   DCI     PUSCH

| TIME UNIT | SPS release DCI | | | PUCCH |

| Controller | 610 |
| Transceiver | 620 |
| Memory | 630 |

| Controller | 710 |
| Transceiver | 720 |
| Memory | 730 |

METHOD AND CORRESPONDING DEVICE FOR UPLINK TRANSMISSION

TECHNICAL FIELD

The disclosure relates to a technical field of wireless communication, in particular to a method and corresponding device for uplink transmission.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Co-ordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

DISCLOSURE OF INVENTION

Technical Problem

In line with the development of communication systems, there is a need for a method or an apparatus capable of effective uplink transmission.

Solution to Problem

According to an aspect of the disclosure, there is provided a method performed by a user equipment (UE) in a wireless communication system, including receiving downlink data and/or downlink control signaling from a base station; and transmitting uplink data and/or uplink control signaling to the base station based on the downlink data and/or downlink control signaling received from the base station.

According to another aspect of the disclosure, there is provided a user equipment (UE) in a wireless communication system, including a transceiver configured to transmit and receive signals; and a controller configured to control the transceiver to perform: receiving downlink data and/or downlink control signaling from a base station; and transmitting uplink data and/or uplink control signaling to the base station based on the downlink data and/or downlink control signaling received from the base station.

According to another aspect of the disclosure, there is provided a method performed by a base station in a wireless communication system, including: transmitting downlink data and/or downlink control signaling to a UE; and receiving, from the UE, uplink data and/or uplink control signaling transmitted by the UE based on the downlink data and/or downlink control signaling received from the base station.

According to another aspect of the disclosure, there is provided a base station in a wireless communication system, including a transceiver configured to transmit and receive signals; and a controller configured to control the transceiver to perform: transmitting downlink data and/or downlink control signaling to a UE; and receiving, from the UE, uplink data and/or uplink control signaling transmitted by the UE based on the downlink data and/or downlink control signaling received from the base station.

Other technical features may be readily apparent to one skilled in the art from the following figures, descriptions, and claims.

Definitions for other certain words and phrases are provided throughout this patent document. Those of ordinary skill in the art should understand that in many if not most instances, such definitions apply to prior as well as future uses of such defined words and phrases.

Advantageous Effects of Invention

Methods proposed in various embodiments of the disclosure clarify the behavior of the UE, improve the reliability of data transmission, reduce the user plane latency, and improve the spectrum efficiency of the network.

Also, the methods clarify the behavior of the UE, make the understanding of the HARQ-ACK codebook by the UE and the base station consistent, and improve the reliability of the transmission of the HARQ-ACK codebook.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and additional aspects and advantages of the present application will become more apparent and easily understood from the following description taken in conjunction with the accompanying drawings, in which:

FIG. 1 shows a block diagram of a second type of transceiver node according to an embodiment of the disclosure;

FIG. 2A shows a flowchart of a method performed by a UE according to an embodiment of the disclosure;

FIG. 2B shows a flowchart of a method performed by a UE according to an embodiment of the disclosure;

FIG. 3 shows a block diagram of a first type of transceiver node according to an embodiment of the disclosure;

FIG. 4A shows a flowchart of a method performed by a base station according to an embodiment of the disclosure;

FIG. 4B shows a flowchart of a method performed by a base station according to an embodiment of the disclosure;

FIG. 5A shows an example of uplink transmission timing according to an embodiment of the disclosure;

FIG. 5B shows an example of uplink transmission timing according to an embodiment of the disclosure;

FIG. 5C shows an example of uplink transmission timing according to an embodiment of the disclosure;

FIG. 6 shows a structure of a UE according to an embodiment of the disclosure; and FIG. 7 shows a structure of a base station according to an embodiment of the disclosure.

MODE FOR THE INVENTION

Figures 5C, 6, 7:
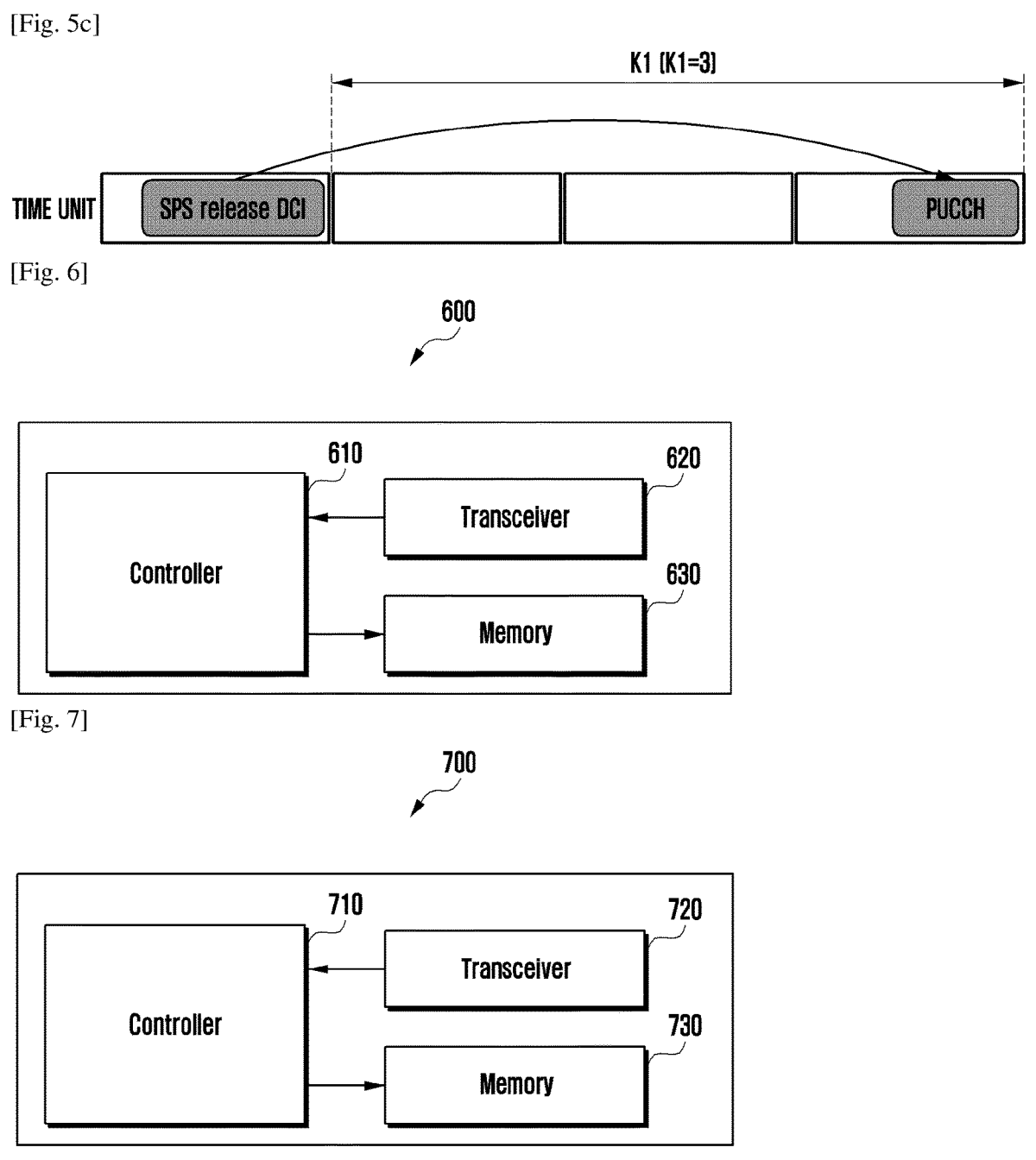

FIG. 1 through 7, discussed below, and the various embodiments used to describe the principles of the disclosure in this patent document are by way of illustration only and should not be construed in any way to limit the scope of the disclosure. Those skilled in the art will understand that the principles of the disclosure may be implemented in any suitably-arranged system or device.

In order to make the purposes, technical schemes and advantages of the embodiments of the disclosure clearer, the technical schemes of the embodiments of the disclosure will be described clearly and completely with reference to the drawings of the embodiments of the disclosure. Obviously, the described embodiments are some but not all embodiments of the disclosure. Based on the described embodiments of the disclosure, all other embodiments obtained by those of ordinary skill in the art without creative labor belong to the scope of protection of the disclosure.

Before the following description of the specific embodiments, it may be advantageous to clarify the definitions of certain words and phrases used throughout this patent document. The term "couple" and the derivatives thereof refer to any direct or indirect communication between two or more elements, no matter whether these elements are physically contacting with each other. The terms "transmit", "receive" and "communicate" and the derivatives thereof encompass both direct and indirect communication. The terms "include" and "contain" and the derivatives thereof mean including but not limited to. The term "or" is inclusive and means and/or. The phrase "associated with" and the derivatives thereof mean including, included in, connected to, inter-connected with, containing, contained in, connected to or connected with, coupled to or coupled with, communicable with, cooperated with, interweaving, juxtaposing, approximated to, bound to or bound with, having, having properties of, having a relationship of or having a relationship with, and the like. The term "controller" means any device, system or part thereof that controls at least one operation. Such a controller may be implemented in hardware or in a combination of hardware and software and/or firmware. Functions associated with any particular controller may be centralized or distributed locally or remotely. The phrase "at least one of . . . " when used with a list of items means that different combinations of one or more listed items may be used, and only one item in the list may be needed. For example, "at least one of A, B and C" includes any one of the following combinations: A, B, C, A and B, A and C, B and C, and A and B and C. For example, "at least one of A, B or C" includes any one of the following combinations: A, B, C, A and B, A and C, B and C, and A and B and C.

In addition, various functions described below may be implemented or supported by one or more computer programs, each of which is formed by computer-readable program code and embodied in a computer-readable medium. The terms "application" and "program" refer to one or more computer programs, software components, instruction sets, procedures, functions, objects, classes, instances, related data or parts thereof suitable for implementation in suitable computer-readable program code. The phrase "computer-readable program code" includes any type of computer code, including source code, object code and executable code. The phrase "computer-readable medium" includes any type of medium that can be accessed by a computer, such as Read-Only Memory (ROM), Random Access Memory (RAM), hard disk drive, compact disk (CD), digital video disk (DVD) or any other type of memory. A "non-transitory" computer-readable medium excludes wired, wireless, optical or other communication links that transmit transient electrical or other signals. Non-transitory computer-readable media include media that can permanently store data and media that can store and later rewrite data, such as rewritable optical disks or erasable memory devices.

Terms used herein to describe embodiments of the invention are not intended to limit and/or define the scope of the invention. For example, unless otherwise defined, the technical terms or scientific terms used in the disclosure shall have the ordinary meaning understood by those with ordinary skills in the art to which the disclosure belongs.

It should be understood that "first", "second" and the like used in the disclosure do not mean any order, quantity or importance, but are only used to distinguish different components. Unless the context clearly indicates otherwise, the singular forms "a", "an" or "the" and the like do not indicate a limitation of quantity, but indicate the existence of at least one.

As used herein, any reference to "one example" or "example", "one embodiment" or "embodiment" means that a particular element, feature, structure or characteristic described in connection with the embodiment is included in at least one embodiment. The phrases "in one embodiment" or "in one example" appearing in different places in the specification do not necessarily refer to the same embodiment.

It should be further understood that the terms "include" or "contain" and the like mean that elements or objects appearing before the term encompass the listed elements or objects appearing after the term and the equivalents thereof, but not exclude other elements or objects. Words "connected to" or "connected with" and the like are not limited to physical or mechanical connections, but may include electrical connections, whether direct or indirect. "Upper", "lower", "left" and "right" are only used to express a relative positional relationship, and when an absolute position of a described object changes, the relative positional relationship may change accordingly.

The various embodiments discussed below for describing the principles of the disclosure in this patent document are for illustration only and should not be interpreted as limiting the scope of the disclosure in any way. Those skilled in the art will understand that the principles of the disclosure may be implemented in any suitably arranged wireless communication system. For example, although the following detailed description of the embodiments of the disclosure will be directed to LTE and 5G, those skilled in the art can understand that main gists of the disclosure may also be applied to other communication systems with similar technical backgrounds and channel formats with slight modifications without departing from the scope of the disclosure.

As can be understood by those skilled in the art, "terminal" and "terminal device" as used herein include not only a device serving as a wireless signal receiver which has no transmitting capability, but also a hardware device for receiving and transmitting, which has a hardware device for receiving and transmitting in bidirectional communication on a bidirectional communication link. Such devices may include a cellular or other communication devices with a single-line display or a multi-line display or a cellular or other communication devices without a multi-line display; a PCS (personal communication system), which is capable of combining voice, data processing, fax and/or data communication; a PDA (personal digital assistant), which may include a radio frequency receiver, pager, internet/intranet access, web browser, notepad, calendar and/or GPS (global positioning system) receiver; a conventional laptop and/or palmtop or other device having and/or including a radio frequency receiver. As used herein, "terminal" and "terminal device" may be portable, transportable, installed in vehicles (aviation, sea transportation and/or land), or suitable and/or configured to run locally, and/or in distributed form, running at any other position on the earth and/or space. As used herein, "terminal" and "terminal device" may also be a communication terminal, an internet terminal and a music/video playing terminal, such as a PDA, a MID (mobile internet device) and/or a mobile phone with a music/video playing function, as well as a smart TV, a set-top box and other devices.

With the rapid development of information industry, especially the increasing demand from mobile Internet and internet of things (IoT), unprecedented challenges are brought to the future mobile communication technology. According to a report of International Telecommunication Union (ITU), ITU-R M.[IMT.BEYOND 2020.TRAFFIC], it can be predicted that by 2020, the growth of mobile traffic will be nearly 1000 times compared with that in 2010 (4G era), and the number of UE connections will also exceed 17 billion. With massive IoT devices gradually infiltrating into the mobile communication network, the number of connected devices will be even more alarming. In order to meet these unprecedented challenges, the communication industry and academia have launched extensive research on the fifth generation mobile communication technology (5G) to face the 2020s. At present, framework and overall goals of the future 5G has already been discussed in ITU report ITU-R M.[IMT.VISION], in which the demand outlook, application scenarios and various important performance indicators of 5G are described in detail. With respect to the new demands in 5G, ITU report ITU-R M.[IMT.FUTURE TECHNOLOGY TRENDS] provides information related to trends of 5G technology, aiming at solving significant problems such as significantly improved system throughput, consistent user experience, scalability to support IoT, latency, energy efficiency, cost, network flexibility, support of emerging services and flexible spectrum utilization. In 3GPP (3rd Generation Partnership Project), the first phase of 5G is already in progress. To support more flexible scheduling, 3GPP decides to support variable Hybrid Automatic Repeat Request-Acknowledgement (HARQ-ACK) transmission time in 5G. In an existing Long Term Evolution (LTE) system, the time from the reception of downlink data to the uplink transmission of HARQ-ACK is fixed. For example, in a Frequency Division Duplex (FDD) system, the latency is 4 subframes, and in a Time Division Duplex (TDD) system, a HARQ-ACK transmission time is determined for the corresponding downlink subframe according to uplink and downlink configuration. In a 5G system, whether FDD or TDD, for a certain downlink time unit (for example, a downlink slot or a downlink mini-slot), the uplink time unit available for transmitting HARQ-ACK is variable. For example, the transmission time of HARQ-ACK may be dynamically indicated by physical layer signaling, and different HARQ-ACK latencies may be determined according to factors such as different services or user capabilities.

The 3GPP has defined three directions of 5G application scenarios: eMBB (enhanced mobile broadband), mMTC (massive machine-type communication) and URLLC (ultra-reliable and low-latency communication). The eMBB scenario aims to further improve the data transmission rate on the basis of the existing mobile broadband service scenario, so as to enhance user experience and pursue ultimate communication experience between human and human. mMTC and URLLC are application scenarios of the Internet of Things, but their respective emphases are different: mMTC is mainly the information interaction between human and things, while URLLC mainly reflects communication needs between things and things.

In 5G, eMBB and URLLC would adopt a manner of joint networking, that is, both URLLC service and eMBB service would be supported in the same cell. As URLLC service may be sparse, compared with URLLC alone, joint networking of eMBB and URLLC may improve spectrum efficiency of the system. If there is a URLLC service in the system, URLLC service is preferentially scheduled; and if there is no URLLC service in the system or resources occupied by URLLC service are few, eMBB service may be scheduled. At present, if there is a conflict between URLLC service and eMBB service, the data and/or control information of URLLC service will be preferentially transmitted, thus deteriorating the performance of eMBB service. Therefore, how to optimize the transmission of data and control information of eMBB service is an urgent problem to be solved.

Communication may include unicast communication, groupcast (or multicast) communication, or broadcast communication. Unicast communication may refer to transmission between nodes (for example, between a base station and a terminal), and groupcast communication or broadcast communication may refer to transmission from one node (for example, a base station) to multiple nodes (for example, multiple terminals). Generally, broadcast communication is directed from one source component to all sink components in the system, while groupcast communication is directed from one source component to a subset of possible sink components. However, it should be noted that in embodiments of the disclosure, the term "groupcast/broadcast" may mean at least one of broadcast communication or groupcast communication. When the downlink data received by multiple users are the same, the base station may transmit groupcast/broadcast PDSCH(s) (Physical Downlink Shared Channel(s)). For a periodic service, the base station may also transmit groupcast/broadcast SPS (Semi-Persistent Scheduling) PDSCH(s). Therefore, in these scenarios, how to configure groupcast/broadcast SPS PDSCH(s), how to activate/deactivate groupcast/broadcast SPS PDSCH(s), how to retransmit groupcast/broadcast SPS PDSCH(s), how to generate a HARQ-ACK codebook for SPS PDSCH(s), and how to multiplex HARQ-ACK of SPS PDSCH(s) and other UCI(s) are the problems to be solved.

To at least solve the above problems, embodiments of the disclosure provide a method, a terminal, a base station and a non-transitory computer-readable storage medium for transmitting and receiving signals in a wireless communication system. Hereinafter, various embodiments of the disclosure will be described in detail with reference to the accompanying drawings.

Hereinafter, embodiments of the disclosure will be described in detail with reference to the accompanying drawings. It should be noted that the same reference numerals in different drawings will be used to refer to the same elements described.

In embodiments of the disclosure, a first type of transceiver node may be a base station, and a second type of transceiver node may be a UE. In the following examples, the base station is taken as an example (but not limited thereto) to illustrate the first type of transceiver node, and the UE is taken as an example (but not limited thereto) to illustrate the second type of transceiver nodes.

FIG. 1 shows a block diagram of a second type of transceiver node according to an embodiment of the disclosure.

Referring to FIG. 1, the second type of transceiver node 100 may include a transceiver 101 and a controller 102.

The transceiver 101 may be configured to receive a first type of data and/or a first type of control signaling from the first type of transceiver node and transmit a second type of data and/or a second type of control signaling to the first type of transceiver node in a determined time unit.

The controller 102 may be an application specific integrated circuit or at least one processor. The controller 102 may be configured to control the overall operation of the second type of transceiver node, and to control the second type of transceiver node to implement the methods proposed in the embodiments of the disclosure. For example, the controller 102 may be configured to determine the second type of data and/or the second type of control signaling and a time unit for transmitting the second type of data and/or the second type of control signaling based on the first type of data and/or the first type of control signaling, and control the transceiver 101 to transmit the second type of data and/or the second type of control signaling to the first type of transceiver node in the determined time unit.

In some implementations, the first type of data may be data transmitted by the first type of transceiver node to the second type of transceiver node. In the following examples, the downlink data carried by PDSCH(s) (Physical Downlink Shared Channel(s)) is taken as an example (but not limited thereto) to illustrate the first type of data.

In some implementations, the second type of data may be data transmitted by the second type of transceiver node to the first type of transceiver node. In the following examples, the uplink data carried by PUSCH(s) (Physical Uplink Shared Channel(s)) is taken as an example (but not limited thereto) to illustrate the second type of data.

In some implementations, the first type of control signaling may be control signaling transmitted by the first type of transceiver node to the second type of transceiver node. In the following examples, the downlink control signaling is taken as an example (but not limited thereto) to illustrate the first type of control signaling. For example, the downlink control signaling may be DCI(s) (Downlink Control Information) carried by PDCCH(s) (Physical Downlink Control Channel(s)) and/or control signaling carried by PDSCH(s) (Physical Downlink Shared Channel(s)), for example, higher layer control signaling carried by PDSCH(s).

In some implementations, the second type of control signaling may be control signaling transmitted by the second type of transceiver node to the first type of transceiver node. In the following examples, the uplink control signaling is taken as an example (but not limited thereto) to illustrate the second type of control signaling. For example, the uplink control signaling may be UCI (Uplink Control Information) carried by PUCCH(s) (Physical Uplink Control Channel(s)) and/or control signaling carried by PUSCH(s) (Physical Uplink Shared Channel(s)). Types of UCI may include HARQ-ACK information, SR (Scheduling Request), LRR (Link Recovery Request) and CSI (Chanel State Information).

In some implementations, a PUCCH carrying SR may be a PUCCH carrying positive SR. A PUCCH carrying SR may be a PUCCH carrying negative SR. A PUCCH carrying SR may be a PUCCH carrying positive SR and/or negative SR.

In some implementations, CSI may also be Part 1 CSI and/or Part 2 CSI.

In some implementations, a first type of time unit is a time unit for the first type of transceiver node to transmit the first type of data and/or the first type of control signaling. In the following examples, a downlink time unit is taken as an example (but not limited thereto) to illustrate the first type of time unit.

In some implementations, a second type of time unit is a time unit for the second type of transceiver node to transmit the second type of data and/or the second type of control signaling. In the following examples, an uplink time unit is taken as an example (but not limited thereto) to illustrate the second type of time unit.

In some implementations, the first type of time unit and the second type of time unit may be one or more slots, and/or one or more sub-slots, and/or one or more OFDM (Orthogonal Frequency Division Multiplexing) symbols, and/or one or more subframes, and/or one or more spans.

Depending on the network type, the term "base station" or "BS" may refer to any component (or set of components) configured to provide wireless access to the network, such as a transmission point (TP), a transmission-reception point (TRP), an enhanced base station (eNodeB or eNB), a 5G base station (gNB), a macro cell, a femtocell, a WiFi access point (AP) or other wireless-enabled devices. The base station may provide wireless access according to one or more wireless communication protocols, such as 5G 3GPP New Radio Interface/Access (NR), Long Term Evolution (LTE), LTE-Advanced (LTE-A), High Speed Packet Access (HSPA), WiFi 802.11a/b/g/n/ac, etc. For convenience, the terms "BS" and "TRP" are used interchangeably in this patent document to refer to network infrastructure components that provide wireless access to remote terminals. Furthermore, depending on the network type, the terms "user equipment" or "UE" may refer to any of the following, such as "mobile station", "subscriber station", "remote terminal", "wireless terminal", "receiving point", "user device" or simply "terminal". For convenience, the terms "user equipment" or "UE" are used in this patent document to refer to a remote wireless device that wirelessly accesses the BS, whether the UE is a mobile device (such as a mobile phone or a smart phone) or a device that is generally considered fixed (for example, a desktop or a vending machine).

FIG. 2A shows a flowchart of a method performed by a UE according to an embodiment of the disclosure.

In step 211, a UE may receive downlink data and/or downlink control signaling from a base station. In step 212, the UE may transmit uplink data and/or uplink control signaling to the base station based on the downlink data and/or downlink control signaling received from the base station.

FIG. 2B shows a flowchart of a method performed by a UE according to an embodiment of the disclosure. For convenience of description, a cycle process including steps 201 to 203 shown in FIG. 2B is defined as a downlink-uplink transmission process.

Referring to FIG. 2B, in step 201, a UE receives downlink data and/or downlink control signaling from a base station.

In step 202, the UE determines uplink data and/or uplink control signaling, as well as an uplink time unit and/or an uplink physical channel for transmitting the uplink data and/or uplink control signaling based on the downlink data and/or downlink control signaling.

In step 203, the UE transmits the uplink data and/or the uplink control signaling to the base station in the determined uplink time unit.

In some implementations, the UE may perform multiple downlink-uplink transmission processes, and each of the multiple downlink-uplink transmission processes includes step 201, step 202, and step 203. Different downlink-uplink transmission processes may be independent or interrelated.

In some implementations, the downlink control signaling may include DCI(s) carried by PDCCH(s) and/or control signaling carried by PDSCH(s). For example, DCI(s) may be used to schedule transmission of PUSCH(s) or reception of PDSCH(s). Some examples of uplink transmission timing will be described below with reference to FIGS. 5A-5C.

In an example, the UE receives a DCI and receives the PDSCH according to time domain resource indicated in the DCI. For example, the parameter K0 may be used to indicate a time interval between the PDSCH scheduled by the DCI and the PDCCH carrying the DCI, and K0 may be in units of slots. For example, FIG. 5A gives an example of K0=1. In the example shown in FIG. 5A, the time interval from the PDSCH scheduled by the DCI to the PDCCH carrying the DCI is 1 slot.

In another example, the UE receives a DCI and transmits the PUSCH according to time domain resources indicated in the DCI. For example, the parameter K2 may be used to indicate a time interval between the PUSCH scheduled by the DCI and the PDCCH carrying the DCI, and K2 may be in units of slots. For example, FIG. 5B gives an example of K2=1. In the example shown in FIG. 5B, the time interval between the PUSCH scheduled by the DCI and the PDCCH carrying the DCI is 1 slot.

In yet another example, the UE receives the PDSCH, and may transmit HARQ-ACK information for the PDSCH on PUCCH in an uplink time unit. For example, the parameter K1 may be used to indicate a time interval between the PUCCH for transmitting HARQ-ACK information for the PDSCH and the PDSCH, and K1 may be in units of uplink time units, such as slots or a sub-slots. For example, FIG. 5A gives an example of K1=3. In the example shown in FIG. 5A, the time interval between the PUCCH for transmitting HARQ-ACK information for the PDSCH and the PDSCH is 3 slots.

In yet another example, the UE receives a DCI (for example, DCI indicating SPS (Semi-Persistent Scheduling) release), and may transmit HARQ-ACK information for the DCI on PUCCH in an uplink time unit. For example, the parameter K1 may be used to indicate a time interval between the PUCCH for transmitting HARQ-ACK information for the DCI and the DCI, and K1 may be in units of uplink time units, such as slots or a sub-slots. For example, FIG. 5C gives an example of K1=3. In the example of FIG. 5C, the time interval between PUCCH for transmitting HARQ-ACK information for the DCI and the DCI is 3 slots. For example, the parameter K1 may be used to indicate a time interval between SPS PDSCH reception and the PUCCH feeding back the HARQ-ACK therefor, where K1 is indicated in the DCI for activating the SPS PDSCH. In some implementations, in step S520, the UE may report (or transmit) UE capability to the base station. For example, the UE reports (or transmits) the UE capability to the base station by transmitting the PUSCH. In this case, the PUSCH transmitted by the UE includes UE capability information.

In some implementations, the base station may configure higher layer signaling for the UE according to the UE capability previously received from the UE (for example, in step 202 in the previous downlink-uplink transmission process). For example, the base station configures higher layer signaling for the UE by transmitting PDSCH(s). In this case, the PDSCH(s) transmitted by the base station includes higher layer signaling for a UE configuration. It should be noted that higher layer signaling is higher layer signaling compared with physical layer signaling. For example, higher layer signaling may include RRC (Radio Resource Control) signaling and/or MAC (Media Access Control) CE (Control Element).

In some implementations, the UE may be configured with two priorities for uplink transmission. For example, the two priorities may include a first priority and a second priority which are different from each other. In an example, the first priority may be higher than the second priority. In another example, the first priority may be lower than the second priority. However, embodiments of the disclosure are not limited thereto, for example, the UE may be configured with more than two priorities. For the sake of convenience, in the embodiments of the disclosure, description is made under the consideration of that the first priority is higher than the second priority. It should be noted that all embodiments of the disclosure are applicable to the case where the first priority may be higher than the second priority; all embodiments of the disclosure are applicable to the case where the first priority may be lower than the second priority; and all embodiments of the disclosure are applicable to the case where the first priority may be equal to the second priority.

In an example, two priorities may be indicated by priority numbers or priority indexes (for example, priority index 1 and priority index 0). For example, a larger priority index may correspond to a higher priority, that is, priority corresponding to priority index 1 may be higher than priority corresponding to priority index 0. In this case, a larger priority index (for example, priority index 1) may be a higher priority (for example, first priority), and a smaller priority index (for example, priority index 0) may be a lower priority (for example, second priority). However, embodiments of the disclosure are not limited thereto, for example, other priority indexes or indicators may be used to indicate the two priorities. For the sake of convenience, in the embodiments of the disclosure, description is made under the consideration of that the priority corresponding to a larger priority index (for example, priority index 1) is higher than that corresponding to a smaller priority index (for example, priority index 0). In addition, in the embodiments of the disclosure, priority index 1 may be used interchangeably with the first priority, a larger priority index or a higher priority, and priority index 0 may be used interchangeably with a second priority, a smaller priority index or a lower priority.

In some implementations, the two priorities configured with the UE may be two physical layer priorities. For example, one of the two priorities (the first priority (for example, priority index 1) or the second priority (for example, priority index 0)) may be provided for PUSCH(s) or PUCCH(s). Specifically, a PUSCH or PUCCH transmission (including a transmission with repetitions if there is a transmission with repetitions) may have (for example, correspond to) the priority index 0 or a larger priority index (for example, priority index 1).

In some implementations, a first priority or a higher priority (for example, a larger priority index (for example, priority index 1)) may correspond to a first service (for example, URLLC service), and a second priority or a lower priority (for example, a smaller priority index (for example, priority index 0)) may correspond to a second service (for example, eMBB service). In an example, with respect to a configured grant PUSCH (for example, Configured Grant PUSCH, CG-PUSCH) transmission, the UE may determine a priority index according to a priority parameter (for example, the parameter priority) (if configured). With respect to a PUCCH transmission with HARQ-ACK information corresponding to SPS PDSCH reception(s) or SPS PDSCH release(s), the UE may determine the priority index of the PUCCH transmission from the HARQ-ACK codebook priority parameter and/or the HARQ-ACK codebook index parameter (for example, the parameter HARQ-CodebookID) (if configured).

In an example, if the priority is not configured or indicated for a PUSCH or PUCCH transmission of the UE, the priority index of the PUSCH or PUCCH transmission may be 0.

In an example, if the UE monitors PDCCH(s) in an active DL BWP to detect DCI format 0_1 and DCI format 1_1 or to detect DCI format 0_2 and DCI format 1_2, the priority index may be provided through a priority indication field. If the UE indicates that it has the capability to monitor PDCCH(s) in the active DL BWP to detect DCI format 0_1 and DCI format 1_1, and to detect DCI format 0_2 and DCI format 1_2, then DCI format 0_1 or DCI format 0_2 may schedule a PUSCH transmission with any priority, and DCI format 1_1 or DCI format 1_2 may schedule a PDSCH reception and trigger a PUCCH transmission with corresponding HARQ-ACK information of any priority.

In an example, the UE may be configured with a PUCCH configuration list parameter (for example, the parameter PUCCH-ConfigurationList), which may include two PUCCH configuration parameters (for example, the parameter PUCCH-config), including a first PUCCH configuration parameter and a second PUCCH configuration parameter. For example, the first PUCCH configuration parameter may correspond to the second priority (for example, the smaller priority index (for example, priority index 0)), that is, the priority of the first PUCCH configuration parameter may be the second priority (for example, a smaller priority index (for example, priority index 0)). Also, the second PUCCH configuration parameter may correspond to the first priority (for example, the larger priority index (for example, priority index 1)), and the priority of the second PUCCH configuration parameter may be the first priority (for example, the larger priority index (for example, priority index 1)).

For example, the sub-slot length parameter of each of the first and second PUCCH configuration parameters (for example, the parameter subslotLengthForPUCCH) may be of 7 OFDM symbols, or 6 OFDM symbols, or 2 OFDM symbols. Sub-slot configuration length parameters in different PUCCH configuration parameters may be configured separately. If no sub-slot length parameter is configured in a PUCCH configuration parameter, the scheduling time unit of the PUCCH configuration parameter is one slot by default. If the sub-slot length parameter is configured in a PUCCH configuration parameter, the scheduling time unit of the PUCCH configuration parameter is a number of OFDM symbols, the number being the configured sub-slot configuration length.

In some implementations, the UE may be configured with a PDSCH HARQ-ACK codebook list parameter (for example, the parameter pdsch-HARQ-ACK-CodebookList). For example, the PDSCH HARQ-ACK codebook list parameter may include two PDSCH HARQ-ACK codebook configuration parameters (for example, the parameter pdsch-HARQ-ACK-Codebook), including a first PDSCH HARQ-ACK codebook configuration parameter and a second PDSCH HARQ-ACK codebook configuration parameter. For example, the first PDSCH HARQ-ACK codebook configuration parameter corresponds to a first HARQ-ACK codebook configuration, where the first HARQ-ACK codebook is associated with PUCCH(s) with a smaller priority index (for example, priority index 0), and the second PDSCH HARQ-ACK codebook configuration parameter corresponds to a second HARQ-ACK codebook configuration, where the second HARQ-ACK codebook is associated with PUCCH(s) with a larger priority index (for example, priority index 1). In this case, the priority of the first HARQ-ACK codebook may be the second priority (for example, the smaller priority index (for example, priority index 0)), and the priority of the second HARQ-ACK codebook may be the first priority (for example, the larger priority index (for example, priority index 1)). For example, the UE may determine to generate a semi-static HARQ-ACK codebook (for example, a 3GPP Type-1 HARQ-ACK codebook), a dynamic HARQ-ACK codebook (for example, a 3GPP Type-2 HARQ-ACK codebook) or an enhanced dynamic HARQ-ACK codebook (for example, a 3GPP Type-2 HARQ-ACK codebook grouping and HARQ-ACK retransmission) according to the PDSCH HARQ-ACK codebook configuration parameter.

A HARQ-ACK codebook may include HARQ-ACK information for one or more PDSCHs and/or DCIs. If the HARQ-ACK information for one or more PDSCHs and/or DCIs is transmitted in a same uplink time unit, the UE generates a HARQ-ACK codebook according to a predefined rule. For example, the UE generates the HARQ-ACK codebook according to a pseudo code specified in a protocol. For example, the UE receives a DCI format indicating SPS deactivation, and the UE transmits HARQ-ACK information for the DCI format. For example, the UE receives a DCI format indicating secondary cell dormancy, and the UE transmits HARQ-ACK information for the DCI format. For example, the UE receives a DCI format indicating to transmit HARQ-ACK information for all the HARQ-ACK processes (for example, a one shot HARQ-ACK codebook, for another example, a Type-3 HARQ-ACK codebook in 3GPP TS 38.213), and the UE transmits HARQ-ACK information for all the HARQ-ACK processes. For example, the UE receives a DCI format to schedule a PDSCH, and the UE transmits HARQ-ACK information for the PDSCH. For example, the UE receives a SPS PDSCH, and the UE transmits HARQ-ACK information for the PDSCH. For example, the UE is configured by higher layer signaling to receive a SPS PDSCH, and the UE transmits HARQ-ACK information for the PDSCH. If the UE is configured by higher layer signaling to receive a SPS PDSCH, the SPS PDSCH may be cancelled by other signaling. For example, the UE is configured by higher layer signaling such that an uplink symbol (for example, an OFDM symbol) in a semi-static frame structure overlaps with a symbol of the SPS PDSCH(s), and the UE does not receive the SPS PDSCH(s). For example, the UE is configured by higher layer signaling to receive a SPS PDSCH according to a predefined rule, and the UE transmits HARQ-ACK information for the PDSCH(s).

Methods for multiplexing and/or prioritizing UCI(s) with different priorities in the embodiments of the disclosure may be applicable to UCI(s) of unicast PDSCH(s) and/or UCI(s) of groupcast (or multicast)/broadcast PDSCH(s). For example, both the UCI of the first priority and the UCI of the second priority may be HARQ-ACK, SR, CSI of the unicast PDSCH(s). For example, both the UCI of the first priority and the UCI of the second priority may be HARQ-ACK of the groupcast/broadcast PDSCH(s). For example, the UCI of the first priority may be HARQ-ACK, SR and CSI of the unicast PDSCH(s), and the UCI of the second priority may be HARQ-ACK of the groupcast/broadcast PDSCH(s).

In embodiments of the disclosure, unicast may refer to a manner in which the network communicates with one UE, and groupcast/broadcast may refer to a manner in which network communicates with multiple UEs. For example, a unicast PDSCH may be a PDSCH received by one UE, and scrambling of the PDSCH may be based on a UE-specific radio network temporary identifier (RNTI), such as C-RNTI. The unicast PDSCH may also be a unicast SPS PDSCH. A groupcast/broadcast PDSCH may be a PDSCH received by more than one UE simultaneously, and scrambling of the groupcast/broadcast PDSCH may be based on a RNTI common to the UE group. For example, the RNTI common to the UE group for scrambling of the multicast/broadcast PDSCH may include a RNTI (referred to as a G-RNTI or a first RNTI in embodiments of the disclosure) for scrambling of dynamically scheduled groupcast/broadcast transmission(s) (for example, PDSCH(s)) or a RNTI (referred to as a GS-RNTI or a second RNTI in embodiments of the disclosure) for scrambling of groupcast/broadcast SPS transmission(s) (for example, SPS PDSCH(s)). The GS-RNTI and the G-RNTI may be different RNTIs or the same RNTI. The UCI(s) of the unicast PDSCH(s) may include HARQ-ACK information, SR, or CSI of the unicast PDSCH(s). The UCI(s) of the groupcast (or multicast)/broadcast PDSCH(s) may include HARQ-ACK information for the groupcast/broadcast PDSCH(s). In embodiments of the disclosure, "groupcast/broadcast" may refer to at least one of groupcast or broadcast. In addition, it should be noted that, although for convenience of description, the RNTI for scrambling of the dynamically scheduled groupcast/broadcast transmission(s) (for example, PDSCH(s)) is referred to as the G-RNTI or a first RNTI, and the RNTI for scrambling of the groupcast/broadcast SPS transmission(s) (for example, SPS PDSCH(s)) is referred to as the GS-RNTI or a second RNTI in the embodiments of the disclosure, this manner for naming RNTIs is only an example, and any suitable manner may be adopted to name each RNTI.

FIG. 3 shows a block diagram of a first type of transceiver node according to an embodiment of the disclosure.

Referring to FIG. 3, the first type of transceiver node 300 may include a transceiver 301 and a controller 302.

The transceiver 301 may be configured to transmit the first type of data and/or the first type of control signaling to a second type of transceiver node and receive a second type of data and/or a second type of control signaling from the second type of transceiver node in a time unit.

The controller 302 may be an application specific integrated circuit or at least one processor. The controller 102 may be configured to control the overall operation of the first type of transceiver node, including controlling the transceiver 301 to transmit the first type of data and/or the first type of control signaling to the second type of transceiver node and receive the second type of data and/or the second type of control signaling from the second type of transceiver node in a determined time unit, in which the second type of data and/or the second type of control signaling and the time unit are determined by the second type of transceiver node based on the received first type of data and/or the first type of control signaling.

In the following description, a base station is taken as an example (but not limited thereto) to illustrate the first type of transceiver node, a UE is taken as an example (but not limited thereto) to illustrate the second type of transceiver node, the first type of time unit is illustrated by a downlink time unit (but not limited thereto), and the time unit is illustrated by an uplink time unit (but not limited thereto). The first type of data and/or the first type of control signaling is illustrated by downlink data and/or downlink control signaling (but not limited thereto). A HARQ-ACK codebook may be included in the second type of control signaling, and the second type of control signaling is illustrated by the uplink control signaling (but not limited thereto).

FIG. 4A shows a flowchart of a method performed by a base station according to an embodiment of the disclosure.

In step 411, a base station may transmit downlink data and/or downlink control signaling to a UE. In step 412, the base station may receive from the UE uplink data and/or uplink control signaling transmitted by the UE based on the downlink data and/or downlink control signaling received from the base station.

FIG. 4B shows a flowchart of a method performed by a base station according to an embodiment of the disclosure.

Firstly, in step S401, a base station transmits downlink data and/or downlink control signaling to a UE.

In step S402, the base station receives a second type of data and/or a second type of control signaling from the UE in an uplink time unit, where the second type of data and/or the second type of control signaling and the uplink time unit are determined by the UE based on the received downlink data and/or downlink control signaling.

Those skilled in the art will understand that the base station decodes the second type of data and/or the second type of control signaling based on methods corresponding to the methods performed by the UE in the above embodiments.

In some implementations, the uplink channel(s) includes PUCCH(s) and/or PUSCH(s).

If HARQ-ACK information transmitted in a same uplink time unit does not include HARQ-ACK information for any DCI format, nor does it include HARQ-ACK information for dynamically scheduled PDSCH(s) (for example, PDSCH(s) scheduled by DCI format(s)) and/or a DCI, or the HARQ-ACK information transmitted in a same uplink time unit only includes HARQ-ACK information for one or more SPS PDSCHs, the UE may generate the HARQ-ACK information according to a rule for generating an SPS PDSCH HARQ-ACK codebook.

If the HARQ-ACK information transmitted in a same uplink time unit includes HARQ-ACK information for any DCI format, and/or HARQ-ACK information for dynamically scheduled PDSCH(s) (for example, PDSCH(s) scheduled by DCI format(s)) and/or DCI(s), the UE may generate the HARQ-ACK information according to a rule for generating a HARQ-ACK codebook for the dynamically scheduled PDSCH(s) and/or DCI(s). For example, the UE determines to generate a semi-static HARQ-ACK codebook (for example, Type-1 HARQ-ACK codebook in 3GPP TS 38.213) or a dynamic HARQ-ACK codebook (for example, a Type-2 HARQ-ACK codebook in 3GPP TS 38.213) or an enhanced dynamic HARQ-ACK codebook (for example, a Type-2 HARQ-ACK codebook based on grouping and HARQ-ACK retransmission in 3GPP TS 38.213), according to a PDSCH HARQ-ACK codebook configuration parameter (for example, the parameter pdsch-HARQ-ACK-Codebook).

Methods for generating a HARQ-ACK codebook will be described in detail below. Unless otherwise specified, the methods for generating a HARQ-ACK codebook described in the disclosure may be applicable to the same priority. Additionally or alternatively, the methods for generating a HARQ-ACK codebook described in the disclosure may also be applicable to multiple priorities. The methods for generating a HARQ-ACK codebook described in the disclosure may be applicable to HARQ-ACK feedback for unicast and/or groupcast/broadcast PDSCH(s) and/or PDCCH(s).

The UE may be configured with one or more SPS PDSCH configurations in a serving cell c. A SPS PDSCH configuration may be configured with a number of repeated transmissions between slots, $$N_{PDSCH}^{repeat},$$

and $$N_{PDSCH}^{repeat}$$

may be an integer greater than or equal to 1. If the number of repeated transmissions between slots is not configured, it may default to 1. A SPS PDSCH configuration may be configured with a period P, which may be in units of slots, and may be an integer greater than or equal to 1. For SPS PDSCHs with HARQ-ACK information transmitted in a same uplink time unit, the HARQ-ACK information needs to be multiplexed in a same HARQ-ACK codebook. The HARQ-ACK codebook may be transmitted in a PUCCH in the uplink time unit.

When there is HARQ-ACK information only for SPS PDSCH reception(s) in a HARQ-ACK codebook, for example, there is no HARQ-ACK information for dynamically scheduled PDSCH(s) (for example, the dynamically scheduled PDSCH(s) may be PDSCH(s) scheduled by DCI format(s). And for example, the dynamically scheduled PDSCH(s) may include the first activated SPS PDSCH(s)), and there is no HARQ-ACK information for DCI(s) (for example, DCI(s) indicating SPS PDSCH release(s), and for another example, DCI(s) indicating secondary cell dormancy) in the HARQ-ACK codebook, the UE may generate the HARQ-ACK codebook according to the following method.

A HARQ-ACK codebook may include one or more HARQ-ACK first-stage sub-codebooks. A HARQ-ACK first-stage sub-codebook may be a HARQ-ACK codebook of a serving cell.

If the UE is configured with multiple serving cells, each serving cell generates its own HARQ-ACK first-stage sub-codebook respectively, and the HARQ-ACK first-stage sub-codebook of each serving cell constitutes a HARQ-ACK codebook according to the serving cell index in an order from small to large (or in another order, for example, from large to small). For example, a serving cell may be a configured serving cell for the UE, or a configured and activated serving cell for the UE.

A HARQ-ACK first-stage sub-codebook may include one or more HARQ-ACK second-stage sub-codebooks. A HARQ-ACK second-stage sub-codebook is a HARQ-ACK codebook for a SPS PDSCH configuration on the corresponding serving cell thereof. For example, the SPS PDSCH configuration may be a configured SPS PDSCH configuration for the UE, or a configured and activated SPS PDSCH configuration for the UE. The HARQ-ACK second-stage sub-codebooks which is included in a HARQ-ACK first-stage sub-codebook is sorted according to the SPS PDSCH configuration index configured in the serving cell in an order from small to large (or in another order, for example, large to small). Alternatively, the HARQ-ACK second-stage sub-codebooks included in a HARQ-ACK first-stage sub-codebook is sorted according to the SPS PDSCH configuration index configured and activated in the serving cell in an order from small to large (or in another order, for example, from large to small).

A HARQ-ACK second-stage sub-codebook in a HARQ-ACK first-stage sub-codebook may include one or more HARQ-ACK third-stage sub-codebooks. A HARQ-ACK third-stage sub-codebook which is included in a HARQ-ACK second-stage sub-codebook which is included in a HARQ-ACK first-stage sub-codebook is a HARQ-ACK codebook in a downlink time unit for a SPS PDSCH configuration on the corresponding service cell thereof. For example, a downlink time unit may be a slot or a sub-slot. A HARQ-ACK third-stage sub-codebook which is included in a HARQ-ACK second-stage sub-codebook which is included in a HARQ-ACK first-stage sub-codebook corresponding to a serving cell is sorted according to the index of the downlink time unit for the SPS PDSCH reception in an order from small to large (or in another order, for example, from large to small). For example, they are sorted according to the slot index in an order from small to large (or in another order, for example, from large to small).

For example, the HARQ-ACK codebook may be generated according to [pseudo code-1].

---

[pseudo code-1]

---

Set $N_{cells}^{DL}$ to the number of serving cells configured to the UE
Set $N_c^{SPS}$ to the number of SPS PDSCH configuration(s) configured to the UE for serving cell c
Set $N_c^{DL}$ to the number of DL slots for SPS PDSCH reception(s) on serving cell c with HARQ-ACK
information multiplexed on the PUCCH
Set j = 0 – HARQ-ACK information bit index
Set c = 0 – serving cell index
while c < $N_{cells}^{DL}$
    Set s = 0 – SPS PDSCH configuration index
while s < $N_c^{SPS}$
        Set $n_D$ = 0 – slot index
      while $n_D$ < $N_c^{DL}$
        if {
            a UE is configured to receive SPS PDSCH(s) from slot $n_D$ – $N_{PDSCH}^{repeat}$ + 1 to
            slot $n_D$ for SPS PDSCH configuration s on serving cell c, excluding SPS
            PDSCHs that are not required to be received due to overlapping with other SPS
            PDSCH(s) (for example, SPS PDSCH(s) that does not need to be received,
            which may be determined according to 38.214), or based on a UE capability for
            a number of PDSCH receptions in a slot (for example, SPS PDSCH(s) that does
            not need to be received, which may be determined according to 38.214), or due
            to overlapping with a set of symbols (for example, OFDM symbols) indicated as
            uplink by higher layer signaling in a semi-static frame structure (for example,
            the parameter tdd-UL-DL-ConfigurationCommon or the parameter tdd-UL-DL-
            ConfigurationDedicated) where $N_{PDSCH}^{repeat}$ may be provided by higher layer
            signalling (for example, $N_{PDSCH}^{repeat}$ may be provided by pdsch-
            AggregationFactor in sps-Config or, if pdsch-AggregationFactor is not included
            in sps-Config, $N_{PDSCH}^{repeat}$ may be provided by pdsch-AggregationFactor in pdsch-
            config), and
            HARQ-ACK information for all the SPS PDSCH are associated with the
            PUCCH
        }
        $\widehat{o}_j^{ACK}$ = HARQ-ACK information bit for the SPS PDSCH reception
        j = j + 1;
        end if
        $n_D$ = $n_D$ + 1;
      end while
    s = s + 1;
    end while
c = c+ 1;
  end while

---

In a TDD system, if the UE does not transmit a HARQ-ACK codebook including HARQ-ACK information only for SPS PDSCH reception(s) for various reasons, for example, if one or more symbols carrying PUCCH(s) or PUSCH(s) for the HARQ-ACK codebook in an uplink time unit used by the UE to transmit the HARQ-ACK codebook including HARQ-ACK information only for SPS PDSCH reception(s) are configured as downlink by higher layer signaling, or one or more symbols carrying PUCCH(s) or PUSCH(s) for the HARQ-ACK codebook in the uplink time unit are indicated as downlink by dynamic signaling so that the HARQ-ACK codebook including HARQ-ACK information only for SPS PDSCH reception(s) cannot be transmitted, then transmission of the HARQ-ACK codebook including HARQ-ACK information only for SPS PDSCH reception(s) may be delayed. A delayed HARQ-ACK codebook including HARQ-ACK information only for SPS PDSCH reception(s) (for example, a delayed HARQ-ACK codebook including HARQ-ACK information only for SPS PDSCH reception(s)) may be transmitted by the method described in connection with FIGS. 5A to 5C.

The aforementioned HARQ-ACK codebook including HARQ-ACK information only for SPS PDSCH reception(s) may be a HARQ-ACK codebook of HARQ-ACK information for one or more SPS PDSCH receptions.

In addition, the aforementioned HARQ-ACK codebook including HARQ-ACK information only for SPS PDSCH reception(s) may be, for example, a HARQ-ACK codebook including HARQ-ACK information only for SPS PDSCH reception(s) that needs to be delayed due to various reasons, or a HARQ-ACK codebook including HARQ-ACK information only for SPS PDSCH reception(s) that has not been transmitted and/or cancelled.

The aforementioned HARQ-ACK codebook including HARQ-ACK information only for SPS PDSCH reception(s) that has not been transmitted and/or cancelled may occur for the following reasons: if PUCCH(s) and/or PUSCH(s) carrying the HARQ-ACK codebook for the SPS PDSCH(s) overlaps with a set of symbols which are indicated as downlink symbols and/or flexible symbols by higher layer signaling (for example, the parameter tdd-UL-DL-ConfigurationCommon or the parameter tdd-UL-DL-ConfigurationDedicated) and/or DCI (for example, dynamic DFI), the UE does not transmit and/or cancel transmitting HARQ-ACK for the SPS PDSCH(s). However, the reason why the HARQ-ACK codebook including HARQ-ACK information only for SPS PDSCH reception(s) that has not been transmitted and/or cancelled occurs is not limited thereto.

In a TDD system, if one or more symbols in an uplink time unit are configured as downlink by higher layer signaling, or one or more symbols in an uplink time unit are indicated as downlink by dynamic signaling, the UE cannot transmit a HARQ-ACK codebook including HARQ-ACK information only for SPS PDSCH reception(s) (for example, a delayed HARQ-ACK codebook including HARQ-ACK information only for SPS PDSCH reception(s)). The HARQ-ACK codebook including HARQ-ACK information only for SPS PDSCH reception(s) (for example, a delayed HARQ-ACK codebook including HARQ-ACK information only for SPS PDSCH reception(s)) may be transmitted in the following manner.

For example, transmission of a HARQ-ACK codebook including HARQ-ACK information only for SPS PDSCH reception(s) (for example, a delayed HARQ-ACK codebook including HARQ-ACK information only for SPS PDSCH reception(s), for example, a HARQ-ACK codebook including HARQ-ACK information only for SPS PDSCH reception(s) that has not been transmitted and/or cancelled, for example, the HARQ-ACK codebook including HARQ-ACK information only for SPS PDSCH reception(s) may be a HARQ-ACK codebook of HARQ-ACK information for one or more SPS PDSCH receptions) is delayed to the first and/or the next available uplink resource.

For example, transmission of the HARQ-ACK of HARQ-ACK information for the SPS PDSCH(s) that has not been transmitted and/or cancelled is delayed to the first and/or the next available uplink resource. For example, if the PUCCH(s) carrying the HARQ-ACK codebook for the SPS PDSCH(s) overlaps with a set of symbols which are indicated as downlink symbols and/or flexible symbols by higher layer signaling (for example, the parameter tdd-UL-DL-ConfigurationCommon or the parameter tdd-UL-DL-ConfigurationDedicated) and/or DCI (for example, dynamic DFI), the UE does not transmit and/or cancel transmitting HARQ-ACK for the SPS PDSCH(s).

For example, the uplink resource may be an available PUCCH resource and/or a PUSCH resource.

For example, the UE may report (or transmit) a capability that supports transmission of the HARQ-ACK for the SPS PDSCH(s) that has not been transmitted and/or cancelled being delayed to the first and/or the next available uplink resource (for example, PUCCH resource). For example, the UE may report (or transmit) a capability that supports the HARQ-ACK for the SPS PDSCH(s) that has not been transmitted and/or cancelled being multiplexed with the HARQ-ACK for SPS PDSCH(s) and/or dynamically scheduled PDSCH(s) and/or DCI(s) in a same PUCCH and/or PUSCH for transmission.

For example, the UE may report (or transmit) a capability that supports the HARQ-ACK codebook including HARQ-ACK information only for SPS PDSCH reception(s) (for example, a delayed HARQ-ACK codebook including HARQ-ACK information only for SPS PDSCH reception(s)) being multiplexed with the HARQ-ACK information for dynamically scheduled PDSCH(s) and/or DCI(s) in a same PUCCH for transmission.

For example, the UE may report (or transmit) a capability that supports the HARQ-ACK codebook including HARQ-ACK information only for SPS PDSCH reception(s) (for example, a delayed HARQ-ACK codebook including HARQ-ACK information only for SPS PDSCH reception(s)) being multiplexed with HARQ-ACK information for SPS PDSCH(s) and/or dynamically scheduled PDSCH(s) and/or DCI(s) in a same PUCCH for transmission.

For example, the above UE capability reporting may be applicable to all types of HARQ-ACK codebooks, or the UE capability reporting is for a specific type of HARQ-ACK codebook. For example, a specific type of HARQ-ACK codebook may be semi-static, or dynamic, or enhanced dynamic. For example, it may be configured by higher layer signaling (for example, a specified parameter) whether the UE may delay the HARQ-ACK codebook including HARQ-ACK information only for SPS PDSCH reception(s) (for example, a delayed HARQ-ACK codebook including HARQ-ACK information only for SPS PDSCH reception(s)) to the first and/or next available uplink resource for transmission. For example, the specified parameter may be configured in parameter PUCCH-Config, and/or parameter BWP-UplinkDedicated, and/or parameter SPS-Config.

For example, it may be configured by higher layer signaling (for example, a specified parameter) whether the UE may delay the transmission of the HARQ-ACK for the SPS PDSCH(s) that has not been transmitted and/or cancelled to the first and/or next available uplink resource. For example, the specified parameter may be configured in parameter PUCCH-Config, and/or parameter BWP-UplinkDedicated, and/or parameter SPS-Config.

If the HARQ-ACK codebook including HARQ-ACK information only for SPS PDSCH reception(s) (for example, a delayed HARQ-ACK codebook including HARQ-ACK information only for SPS PDSCH reception(s)) and HARQ-ACK for at least one dynamically scheduled PDSCH (for example, the dynamically scheduled PDSCH may be a PDSCH scheduled by a DCI format, for example, the dynamically scheduled PDSCH may include the first activated SPS PDSCH and/or DCI (for example, a DCI indicating SPS PDSCH release(s), for example, a DCI indicating secondary cell dormancy) is transmitted in a same uplink time unit, the HARQ-ACK codebook including HARQ-ACK information only for SPS PDSCH reception(s) and the HARQ-ACK for dynamically scheduled PDSCH(s) and/or DCI(s) may be multiplexed in a same PUCCH for transmission.

For example, it may be configured by higher layer signaling (for example, a specified parameter) whether the UE may multiplex the HARQ-ACK codebook including HARQ-ACK information only for SPS PDSCH reception(s) (for example, a delayed HARQ-ACK codebook including HARQ-ACK information only for SPS PDSCH reception(s)) and HARQ-ACK for dynamically scheduled PDSCH(s) and/or DCI(s) in a same PUCCH and/or for transmission. For example, the specified parameter may be configured in parameter PUCCH-Config, and/or parameter BWP-UplinkDedicated, and/or parameter SPS-Config.

Available uplink resources are described in various situations below.

[Situation 1]

Available uplink resources may be available PUCCH resources.

For example, an available PUCCH resource may be in at least one of the following sets.

Set A: a list of PUCCH resources configured by higher layer signaling for transmitting a HARQ-ACK codebook including HARQ-ACK information only for SPS PDSCH reception(s) (for example, a delayed HARQ-ACK codebook including HARQ-ACK information only for SPS PDSCH reception(s)), for example, PUCCH resources configured in parameter SPS-PUCCH-AN-List.

Set B: a list of PUCCH resources configured by higher layer signaling for transmitting a HARQ-ACK codebook including HARQ-ACK information for dynamically scheduled PDSCH(s), for example, PUCCH resources configured in parameter resourceSetToAddModList.

Set C: a list of PUCCH resources dedicated for transmitting a HARQ-ACK codebook including HARQ-ACK information only for SPS PDSCH reception(s) (for example, a delayed HARQ-ACK codebook including HARQ-ACK information only for SPS PDSCH reception(s)), for example, PUCCH resources configured by higher layer signaling (for example, the parameter X-List, which may be configured in PUCCH-Config) and dedicated for transmitting the HARQ-ACK codebook including HARQ-ACK information only for SPS PDSCH reception(s) (for example, a delayed HARQ-ACK codebook including HARQ-ACK information only for SPS PDSCH reception(s)). For example, the list of PUCCH resources may include one or more PUCCH resources. For example, the list of PUCCH resource may include one or more virtual PUCCH resources. For example, a virtual PUCCH resource may be configured by higher layer signaling. For example, a virtual PUCCH resource may be a PUCCH resource overlapping with a set of symbols which are indicated as downlink symbols and/or flexible symbols by higher layer signaling (for example, the parameter tdd-UL-DL-ConfigurationCommon or parameter tdd-UL-DL-ConfigurationDedicated) and/or overlapping with a set of symbols which are indicated as downlink symbols and/or flexible symbols by DCI (for example, dynamic DFI). For another example, a virtual PUCCH resource may be a PUCCH resource overlapping with at least one PUSCH in time domain. For another example, a virtual PUCCH resource may be a PUCCH resource overlapping with a set of symbols which are indicated as downlink symbols and/or flexible symbols by higher layer signaling (for example, the parameter tdd-UL-DL-Configu-rationCommon or parameter tdd-UL-DL-Configuration-Dedicated) and/or overlapping with a set of symbols which are indicated as downlink symbols and/or flexible symbols by DCI (for example, dynamic DFI) and overlapping with at least one PUSCH in time domain. The PUSCH(s) may be, for example, dynamically scheduled PUSCH(s), and/or con-figured grant PUSCH(s) (for example, CG-PUSCH(s)), and/or PUSCH(s) dedicated for transmitting the HARQ-ACK codebook including HARQ-ACK information only for SPS PDSCH reception(s) (for example, a delayed HARQ-ACK codebook including HARQ-ACK information only for SPS PDSCH reception(s)).

It should be noted that Set A, and/or Set B, and/or Set C may only include PUCCH resources with the same priority. Alternatively, Set A, and/or Set B, and/or Set C may respectively include PUCCH resources with multiple priori-ties. For example, the priority of the HARQ-ACK codebook including HARQ-ACK information only for SPS PDSCH reception(s) is the first priority, and the PUCCH resources in Set A are PUCCH resources corresponding to the first priority. Alternatively, the PUCCH resources in Set A are PUCCH resources corresponding to the first priority and the second priority. The UE may indicate the priorities of PUCCH resources in one or more sets supported by the UE through capability reporting. The base station may config-ure, by higher layer signaling (for example, by a new parameter configuration), PUCCH resources with the same priority in one or more sets or PUCCH resources with multiple priorities in one or more sets. If there are PUCCH resources with multiple priorities in a set, PUCCH resources with the same priority are preferentially selected. For example, the priority of the HARQ-ACK codebook includ-ing HARQ-ACK information only for SPS PDSCH recep-tion(s) is the first priority, the PUCCH resources in Set A are PUCCH resources corresponding to the first priority and the second priority, and the PUCCH resources with the first priority in Set A are preferentially used to transmit the HARQ-ACK codebook including HARQ-ACK information only for SPS PDSCH reception(s).

It should be noted that Set A, and/or Set B, and/or Set C may only include PUCCH resources of unicast UCI(s). Alternatively, Set A, and/or Set B, and/or Set C may include PUCCH resources of unicast UCI(s) and/or groupcast/ broadcast UCI(s).

It should be noted that when a PUCCH resource carrying HARQ-ACK in Set A, and/or Set B and/or Set C overlaps with SR(s) in time domain, PUCCH resources in Set A, and/or Set B and/or Set C may be used to carry UCIs including HARQ-ACK and SR(s) correspondingly. The number of bits for UCIs is determined by the number of bits for HARQ-ACK and SR(s).

[Situation 2]

Available uplink resources may be available PUCCH resources.

For another example, an available PUCCH resource may be a PUCCH resource in Set A. For example, an available PUCCH resource may be one of PUCCH resources config-ured by higher layer signaling for transmitting a HARQ-ACK codebook including HARQ-ACK information only for SPS PDSCH reception(s) (for example, a delayed HARQ-ACK codebook including HARQ-ACK information only for SPS PDSCH reception(s)) (for example, PUCCH resources configured in parameter SPS-PUCCH-AN-List), and the PUCCH resource may be determined by the number of bits for the HARQ-ACK codebook including HARQ-ACK information only for SPS PDSCH reception(s) (for example, a delayed HARQ-ACK codebook including HARQ-ACK information only for SPS PDSCH reception(s)), for example, according to a manner specified in 3GPP TS 38.213. The PUCCH resource does not overlap with a set of downlink symbols configured by higher layer signaling (for example, the parameter tdd-UL-DL-ConfigurationCommon or parameter tdd-UL-DL-ConfigurationDedicated), and/or the PUCCH resource does not overlap with a set of symbols which are indicated as downlink symbols and/or flexible symbols by DCI (for example, dynamic DFI).

For another example, whether the UE may use a PUCCH resource in Set A to transmit the HARQ-ACK codebook including HARQ-ACK information only for SPS PDSCH reception(s) (for example, a delayed HARQ-ACK codebook including HARQ-ACK information only for SPS PDSCH reception(s)) may also be determined according to the UE capability. For another example, whether the UE may use PUCCH resources that are configured by higher layer sig-naling (for example, PUCCH resources configured in parameter resourceSetToAddModList) for transmitting the HARQ-ACK codebook including HARQ-ACK information only for SPS PDSCH reception(s) (for example, a delayed HARQ-ACK codebook including HARQ-ACK information only for SPS PDSCH reception(s)) to transmit the HARQ-ACK codebook including HARQ-ACK information only for SPS PDSCH reception(s) (for example, a delayed HARQ-ACK codebook including HARQ-ACK information only for SPS PDSCH reception(s)) may also be determined accord-ing to the UE capability. For example, the UE may report (or transmit) a capability that supports using PUCCH resources that are configured by higher layer signaling for transmitting a HARQ-ACK codebook including HARQ-ACK informa-tion for dynamically scheduled PDSCH(s) (for example, PUCCH resources configured in parameter resourceSet-ToAddModList) to transmit the HARQ-ACK codebook including HARQ-ACK information only for SPS PDSCH reception(s) (for example, a delayed HARQ-ACK codebook including HARQ-ACK information only for SPS PDSCH reception(s)). For another example, after receiving the report of the capability of the UE, the base station may configure the UE by higher layer signaling (for example, by a specified parameter) to use PUCCH resources that are configured by higher layer signaling for transmitting a HARQ-ACK code-book including HARQ-ACK information for dynamically scheduled PDSCH(s) (for example, PUCCH resources con-figured in parameter resourceSetToAddModList) to transmit the HARQ-ACK codebook including HARQ-ACK informa-tion only for SPS PDSCH reception(s) (for example, a delayed HARQ-ACK codebook including HARQ-ACK information only for SPS PDSCH reception(s)). Or after receiving the report of the capability of the UE, the base station may configure the UE by higher layer signaling (for example, by a specified parameter) to use PUCCH resources that are configured by higher layer signaling for transmitting a HARQ-ACK codebook including HARQ-ACK information for dynamically scheduled PDSCH(s) (for example, PUCCH resources configured in parameter resourceSet-ToAddModList) to transmit the HARQ-ACK codebook including HARQ-ACK information only for SPS PDSCH reception(s) (for example, a delayed HARQ-ACK codebook including HARQ-ACK information only for SPS PDSCH reception(s)).

The method specifies that the UE may select an available PUCCH from Set A, thus clarifying the behavior of the UE, improving the transmission probability of the HARQ-ACK codebook including HARQ-ACK information only for SPS PDSCH reception(s) (for example, a delayed HARQ-ACK codebook including HARQ-ACK information only for SPS PDSCH reception(s)), reducing the HARQ-ACK transmission latency, reducing the probability of downlink data retransmission, reducing the user plane latency and improving the spectrum efficiency of the network.

For another example, an available PUCCH resource may be a PUCCH resource in an extended Set A. The extended Set A may be a set that extends PUCCH resources configured in 3GPP parameter SPS-PUCCH-AN-List.

For example, N PUCCH resources may be configured in SPS-PUCCH-AN-List, where N is a positive integer. For example, N may be 8 or N may be 16. The relationship between the N PUCCH resources and the number of bits for the HARQ-ACK codebook including HARQ-ACK information only for SPS PDSCH reception(s) is determined by predefined rules. For example, the N PUCCH resources may be divided into M groups, and the PUCCH resources in each group correspond to a range of the number of bits for HARQ-ACK codebook. For example, if N=8 and M=4, 8 PUCCH resources may be equally divided into 4 groups, and the PUCCH resources in the first group are the first and second PUCCH resources configured in SPS-PUCCH-AN-List; the PUCCH resources in the second group are the third and fourth PUCCH resources configured in SPS-PUCCH-AN-List; the PUCCH resources in the third group are the fifth and sixth PUCCH resources configured in SPS-PUCCH-AN-List; and the PUCCH resources in the fourth group are the seventh and eighth PUCCH resources configured in SPS-PUCCH-AN-List;

The PUCCH resource may be determined according to at least one of the following conditions. For another example, a condition for determining the available PUCCH resource may be that the PUCCH resource satisfies both Condition 1 and Condition 2.

Condition 1: the PUCCH resource does not overlap with a set of symbols which are configured as downlink symbols and/or flexible symbols by higher layer signaling (for example, the parameter tdd-UL-DL-ConfigurationCommon or parameter tdd-UL-DL-ConfigurationDedicated), and/or the PUCCH resource does not overlap with a set of symbols which are indicated as downlink symbols and/or flexible symbols by DCI (for example, dynamic DFI).

Condition 2: the PUCCH resource is a PUCCH resource in the set of PUCCH resources determined according to the number of bits for the HARQ-ACK codebook including HARQ-ACK information only for SPS PDSCH reception(s) (for example, a delayed HARQ-ACK codebook including HARQ-ACK information only for SPS PDSCH reception (s)). For example, a PUCCH resource set of PUCCH resources configured by higher layer signaling for transmitting HARQ-ACK for dynamically scheduled PDSCH(s) is determined according to the number of bits for HARQ-ACK codebook including HARQ-ACK information only for SPS PDSCH reception(s) (for example, a delayed HARQ-ACK codebook including HARQ-ACK information only for SPS PDSCH reception(s)). For example, a PUCCH resource set that may be used to transmit the HARQ-ACK codebook including HARQ-ACK information only for SPS PDSCH reception(s) (for example, a delayed HARQ-ACK codebook including HARQ-ACK information only for SPS PDSCH reception(s)) may be determined according to a manner for determining a PUCCH resource set for transmitting the HARQ-ACK codebook including HARQ-ACK information for dynamically scheduled PDSCH(s) in 3GPP TS 38.213. If the number of available PUCCH resources (for example, the available PUCCH resources are PUCCH resources satisfying Condition 1) in the PUCCH resource set is greater than 1, a PUCCH resource may be selected by a predefined rule. For example, the predefined rule may be the PUCCH resource with the smallest starting symbol index or the earliest starting position, or the PUCCH resource with the smallest ending symbol index or the earliest ending position. For another example, the predefined rule may be the PUCCH resource with the smallest or largest index among the PUCCH resources with the smallest starting symbol index or the earliest starting position, or the PUCCH resource with the smallest or largest index among the PUCCH resources with the smallest ending symbol index or the earliest ending position. In another example, the predefined rule may be the PUCCH resource with the smallest or largest index.

For another example, whether the UE may use a PUCCH resource in the extended Set A to transmit the HARQ-ACK codebook including HARQ-ACK information only for SPS PDSCH reception(s) (for example, a delayed HARQ-ACK codebook including HARQ-ACK information only for SPS PDSCH reception(s)) may also be determined according to the UE capability.

The method specifies that the UE may select an available PUCCH from the extended Set A, clarifying the behavior of the UE, and improving the transmission probability of the HARQ-ACK codebook including HARQ-ACK information only for SPS PDSCH reception(s) (for example, a delayed HARQ-ACK codebook including HARQ-ACK information only for SPS PDSCH reception(s)). Compared with selecting an available PUCCH from Set A, it further reduces the HARQ-ACK transmission latency, reduces the probability of downlink data retransmission, reduces the user plane latency, and improves the spectrum efficiency of the network.

[Situation 3]

Available uplink resources may be available PUCCH resources.

For another example, an available PUCCH resource may be a PUCCH resource in Set B. For another example, an available PUCCH resource may be one of PUCCH resources configured by higher layer signaling for transmitting the HARQ-ACK codebook including HARQ-ACK information for dynamically scheduled PDSCH(s) (for example, PUCCH resources configured in parameter resourceSet-ToAddModList).

The PUCCH resource may be determined according to at least one of the following conditions. For another example, a condition for determining the available PUCCH resource may be that the PUCCH resource satisfies both Condition 1 and Condition 2

Condition 1: the PUCCH resource does not overlap with a set of symbols which are configured as downlink symbols and/or flexible symbols by higher layer signaling (for example, the parameter tdd-UL-DL-ConfigurationCommon or parameter tdd-UL-DL-ConfigurationDedicated), and/or the PUCCH resource does not overlap with a set of symbols which are indicated as downlink symbols and/or flexible symbols by DCI (for example, dynamic DFI).

Condition 2: the PUCCH resource is a PUCCH resource in the set of PUCCH resources determined according to the number of bits for the HARQ-ACK codebook including HARQ-ACK information only for SPS PDSCH reception(s) (for example, a delayed HARQ-ACK codebook including HARQ-ACK information only for SPS PDSCH reception(s)). For example, a PUCCH resource set of PUCCH resources configured by higher layer signaling for transmitting HARQ-ACK for dynamically scheduled PDSCH(s) is determined according to the number of bits for HARQ-ACK codebook including HARQ-ACK information only for SPS PDSCH reception(s) (for example, a delayed HARQ-ACK codebook including HARQ-ACK information only for SPS PDSCH reception(s)). For example, a PUCCH resource set that may be used to transmit the HARQ-ACK codebook including HARQ-ACK information only for SPS PDSCH reception(s) (for example, a delayed HARQ-ACK codebook including HARQ-ACK information only for SPS PDSCH reception(s)) may be determined according to a manner for determining a PUCCH resource set for transmitting the HARQ-ACK codebook including HARQ-ACK information for dynamically scheduled PDSCH(s) in 3GPP TS 38.213. If the number of available PUCCH resources (for example, the available PUCCH resources are PUCCH resources satisfying Condition 1) in the PUCCH resource set is greater than 1, a PUCCH resource may be selected by a predefined rule. For example, the predefined rule may be the PUCCH resource with the smallest starting symbol index or the earliest starting position, or the PUCCH resource with the smallest ending symbol index or the earliest ending position. For another example, the predefined rule may be the PUCCH resource with the smallest or largest index among the PUCCH resources with the smallest starting symbol index or the earliest starting position, or the PUCCH resource with the smallest or largest index among the PUCCH resources with the smallest ending symbol index or the earliest ending position. In another example, the predefined rule may be the PUCCH resource with the smallest or largest index.

For another example, whether the UE may use a PUCCH resource in Set B to transmit the HARQ-ACK codebook including HARQ-ACK information only for SPS PDSCH reception(s) (for example, a delayed HARQ-ACK codebook including HARQ-ACK information only for SPS PDSCH reception(s)) may also be determined according to the UE capability. For another example, whether the UE may use PUCCH resources that are configured by higher layer signaling for transmitting the HARQ-ACK codebook including HARQ-ACK information for dynamically scheduled PDSCH(s) (for example, PUCCH resources configured in parameter resourceSetToAddModList) to transmit HARQ-ACK codebook including HARQ-ACK information only for SPS PDSCH reception(s) (for example, A delayed HARQ-ACK codebook including HARQ-ACK information only for SPS PDSCH reception(s)) may also be determined according to the UE capability. For example, the UE may report (or transmit) a capability that supports using PUCCH resources that are configured by higher layer signaling for transmitting a HARQ-ACK codebook including HARQ-ACK information for dynamically scheduled PDSCH(s) (for example, PUCCH resources configured in parameter resourceSet-ToAddModList) to transmit the HARQ-ACK codebook including HARQ-ACK information only for SPS PDSCH reception(s) (for example, a delayed HARQ-ACK codebook including HARQ-ACK information only for SPS PDSCH reception(s)). For another example, after receiving the report of the capability of the UE, the base station may configure the UE by higher layer signaling (for example, by a specified parameter) to use PUCCH resources that are configured by higher layer signaling for transmitting a HARQ-ACK codebook including HARQ-ACK information for dynamically scheduled PDSCH(s) (for example, PUCCH resources configured in parameter resourceSetToAddModList) to transmit the HARQ-ACK codebook including HARQ-ACK information only for SPS PDSCH reception(s) (for example, a delayed HARQ-ACK codebook including HARQ-ACK information only for SPS PDSCH reception(s)). Or after receiving the report of the capability of the UE, the base station may configure the UE by higher layer signaling (for example, by a specified parameter) to use PUCCH resources that are configured by higher layer signaling for transmitting a HARQ-ACK codebook including HARQ-ACK information for dynamically scheduled PDSCH(s) (for example, PUCCH resources configured in parameter resourceSet-ToAddModList) to transmit the HARQ-ACK codebook including HARQ-ACK information only for SPS PDSCH reception(s) (for example, a delayed HARQ-ACK codebook including HARQ-ACK information only for SPS PDSCH reception(s)).

The method specifies that the UE may select an available PUCCH from Set B, clarifying the behavior of the UE, and improving the transmission probability of the HARQ-ACK codebook including HARQ-ACK information only for SPS PDSCH reception(s) (for example, a delayed HARQ-ACK codebook including HARQ-ACK information only for SPS PDSCH reception(s)). Compared with selecting an available PUCCH from Set A, it further reduces the HARQ-ACK transmission latency, reduces the probability of downlink data retransmission, reduces the user plane latency, and improves the spectrum efficiency of the network.

[Situation 4]

For another example, an available PUCCH resource may be a PUCCH resource in Set A and/or Set B. For another example, an available PUCCH resource may be one of PUCCH resources configured by higher layer signaling (for example, PUCCH resources configured in parameter SPS-PUCCH-AN-List) for transmitting a HARQ-ACK codebook including HARQ-ACK information only for SPS PDSCH reception(s) (for example, a delayed HARQ-ACK codebook including HARQ-ACK information only for SPS PDSCH reception(s)) and/or PUCCH resources that are configured by higher layer signaling (for example, PUCCH resources configured in parameter resourceSetToAddModList) for transmitting the HARQ-ACK codebook including HARQ-ACK information for dynamically scheduled PDSCH(s).

An available PUCCH resource in Set A may be determined by methods specified in other descriptions of the disclosure to transmit the HARQ-ACK codebook including HARQ-ACK information only for SPS PDSCH reception(s) (for example, a delayed HARQ-ACK codebook including HARQ-ACK information only for SPS PDSCH reception(s)).

An available PUCCH resource in Set B may be determined by methods specified in other descriptions of the disclosure to transmit the HARQ-ACK codebook including HARQ-ACK information only for SPS PDSCH reception(s) (for example, a delayed HARQ-ACK codebook including HARQ-ACK information only for SPS PDSCH reception(s)).

It may also be specified that the UE preferentially selects a PUCCH resource from Set A. Alternatively, it may also be specified that the UE preferentially selects a PUCCH resource from Set B. For example, in a same uplink time unit, if a PUCCH in Set A may transmit the HARQ-ACK codebook including HARQ-ACK information only for SPS PDSCH reception(s) (for example, a delayed HARQ-ACK codebook including HARQ-ACK information only for SPS PDSCH reception(s)), the PUCCH is used to transmit the HARQ-ACK codebook including HARQ-ACK information only for SPS PDSCH reception(s) (for example, a delayed HARQ-ACK codebook including HARQ-ACK information only for SPS PDSCH reception(s)). Otherwise, a PUCCH is selected from Set B to transmit the HARQ-ACK codebook including HARQ-ACK information only for SPS PDSCH reception(s) (for example, a delayed HARQ-ACK codebook including HARQ-ACK information only for SPS PDSCH reception(s)). Alternatively, for another example, in a same uplink time unit, if a PUCCH in Set B may transmit the HARQ-ACK codebook including HARQ-ACK information only for SPS PDSCH reception(s) (for example, a delayed HARQ-ACK codebook including HARQ-ACK information only for SPS PDSCH reception(s)), the PUCCH is used to transmit the HARQ-ACK codebook including HARQ-ACK information only for SPS PDSCH reception(s) (for example, a delayed HARQ-ACK codebook including HARQ-ACK information only for SPS PDSCH reception(s)). Otherwise, a PUCCH is selected from Set A to transmit the HARQ-ACK codebook including HARQ-ACK information only for SPS PDSCH reception(s) (for example, a delayed HARQ-ACK codebook including HARQ-ACK information only for SPS PDSCH reception(s)).

The method specifies that the UE may select an available PUCCH from Set A or Set B, thus clarifying the behavior of the UE, and improving the transmission probability of the HARQ-ACK codebook including HARQ-ACK information only for SPS PDSCH reception(s) (for example, a delayed HARQ-ACK codebook including HARQ-ACK information only for SPS PDSCH reception(s)). Compared with selecting an available PUCCH from Set A or from Set B, it further reduces the HARQ-ACK transmission latency, reduces the probability of downlink data retransmission, reduces the user plane latency, and improves the spectrum efficiency of the network.

[Situation 5]

Available uplink resources may be available PUCCH resources.

For another example, an available PUCCH resource may be a PUCCH resource in Set C. For example, the number of PUCCH resources configured by higher layer signaling (for example, the parameter X-List, which may be configured in PUCCH-Config) and dedicated for transmitting the HARQ-ACK codebook including HARQ-ACK information only for SPS PDSCH reception(s) (for example, a delayed HARQ-ACK codebook including HARQ-ACK information only for SPS PDSCH reception(s)) is N0 (for example, N0=4). For example, each element in X-List may be configured with a PUCCH resource index or a virtual PUCCH resource index. Optionally, each element in X-List may be configured with a parameter indicating the maximum number of bits for UCI that can be carried, for example, the parameter maxPayloadSize. The value of parameter maxPayloadSize may also be specified by a protocol. The UE may select PUCCH resources according to the number of bits for UCI. The PUCCH resource may be determined by the number of bits for the HARQ-ACK codebook including HARQ-ACK information only for SPS PDSCH reception(s) (for example, a delayed HARQ-ACK codebook including HARQ-ACK information only for SPS PDSCH reception(s)). For example, it may be determined by the UE according to the manner for determining the PUCCH resource for the HARQ-ACK codebook including HARQ-ACK information only for SPS PDSCH reception(s) (for example, a delayed HARQ-ACK codebook including HARQ-ACK information only for SPS PDSCH reception(s)) specified in 3GPP TS 38.213. Alternatively, it may be determined by the methods of determining an available PUCCH resource in Set B specified in other descriptions of the disclosure.

For another example, whether the UE may use a PUCCH resource in Set C to transmit the HARQ-ACK codebook including HARQ-ACK information only for SPS PDSCH reception(s) (for example, a delayed HARQ-ACK codebook including HARQ-ACK information only for SPS PDSCH reception(s)) may also be determined according to the UE capability. For example, the UE may report (or transmit) a capability that supports using the PUCCH resources dedicated for transmitting the HARQ-ACK codebook including HARQ-ACK information only for SPS PDSCH reception(s) (for example, a delayed HARQ-ACK codebook including HARQ-ACK information only for SPS PDSCH reception(s)) to transmit the HARQ-ACK codebook including HARQ-ACK information only for SPS PDSCH reception(s) (for example, a delayed HARQ-ACK codebook including HARQ-ACK information only for SPS PDSCH reception(s)). For another example, after receiving the report of the capability of the UE, the base station may configure the UE by higher layer signaling (for example, by a specified parameter) to use PUCCH resources dedicated for transmitting the HARQ-ACK codebook including HARQ-ACK information only for SPS PDSCH reception(s) (for example, a delayed HARQ-ACK codebook including HARQ-ACK information only for SPS PDSCH reception(s)) to transmit the HARQ-ACK codebook including HARQ-ACK information only for SPS PDSCH reception(s) (for example, a delayed HARQ-ACK codebook including HARQ-ACK information only for SPS PDSCH reception(s)). For another example, the UE may report (or transmit) a capability that supports using virtual PUCCH resources to transmit the HARQ-ACK codebook including HARQ-ACK information only for SPS PDSCH reception(s) (for example, a delayed HARQ-ACK codebook including HARQ-ACK information only for SPS PDSCH reception(s)). For another example, after receiving the report of the capability of the UE, the base station may configure the UE by higher layer signaling (for example, by a specified parameter) to use virtual PUCCH resources to transmit the HARQ-ACK codebook including HARQ-ACK information only for SPS PDSCH reception(s) (for example, a delayed HARQ-ACK codebook including HARQ-ACK information only for SPS PDSCH reception(s)).

The method specifies that the UE may select an available PUCCH from Set C, thus clarifying the behavior of the UE, and improving the transmission probability of the HARQ-ACK codebook including HARQ-ACK information only for SPS PDSCH reception(s) (for example, a delayed HARQ-ACK codebook including HARQ-ACK information only for SPS PDSCH reception(s)). Compared with selecting an available PUCCH from Set A and/or Set B, it may further reduce the HARQ-ACK transmission latency, reduce the probability of downlink data retransmission, reduce the user plane latency and improve the spectrum efficiency of the network.

[Situation 6]

Available uplink resources may be available PUCCH resources.

For another example, an available PUCCH resource may be a PUCCH resource in Set A and/or Set C.

An available PUCCH resource in Set A may be determined by methods specified in other descriptions of the disclosure to transmit the HARQ-ACK codebook including HARQ-ACK information only for SPS PDSCH reception(s) (for example, a delayed HARQ-ACK codebook including HARQ-ACK information only for SPS PDSCH reception(s)).

An available PUCCH resource in Set C may be determined by methods specified in other descriptions of the disclosure to transmit the HARQ-ACK codebook including HARQ-ACK information only for SPS PDSCH reception(s) (for example, a delayed HARQ-ACK codebook including HARQ-ACK information only for SPS PDSCH reception(s)).

It may also be specified that the UE preferentially selects a PUCCH resource from Set A. Alternatively, it may also be specified that the UE preferentially selects a PUCCH resource from Set C. For example, in a same uplink time unit, if a PUCCH in Set A may transmit the HARQ-ACK codebook including HARQ-ACK information only for SPS PDSCH reception(s) (for example, a delayed HARQ-ACK codebook including HARQ-ACK information only for SPS PDSCH reception(s)), the PUCCH is used to transmit the HARQ-ACK codebook including HARQ-ACK information only for SPS PDSCH reception(s) (for example, a delayed HARQ-ACK codebook including HARQ-ACK information only for SPS PDSCH reception(s)). Otherwise, a PUCCH is selected from Set C to transmit the HARQ-ACK codebook including HARQ-ACK information only for SPS PDSCH reception(s) (for example, a delayed HARQ-ACK codebook including HARQ-ACK information only for SPS PDSCH reception(s)). Alternatively, for another example, in a same uplink time unit, if a PUCCH in Set C may transmit the HARQ-ACK codebook including HARQ-ACK information only for SPS PDSCH reception(s) (for example, a delayed HARQ-ACK codebook including HARQ-ACK information only for SPS PDSCH reception(s)), the PUCCH is used to transmit the HARQ-ACK codebook including HARQ-ACK information only for SPS PDSCH reception(s) (for example, a delayed HARQ-ACK codebook including HARQ-ACK information only for SPS PDSCH reception(s)). Otherwise, a PUCCH is selected from Set A to transmit the HARQ-ACK codebook including HARQ-ACK information only for SPS PDSCH reception(s) (for example, a delayed HARQ-ACK codebook including HARQ-ACK information only for SPS PDSCH reception(s)).

The method specifies that the UE may select an available PUCCH from Set A or Set C, thus clarifying the behavior of the UE, and improving the transmission probability of the HARQ-ACK codebook including HARQ-ACK information only for SPS PDSCH reception(s) (for example, a delayed HARQ-ACK codebook including HARQ-ACK information only for SPS PDSCH reception(s)). Compared with selecting an available PUCCH from Set A or from Set C, it further reduces the HARQ-ACK transmission latency, reduces the probability of downlink data retransmission, reduces the user plane latency, and improves the spectrum efficiency of the network.

[Situation 7]

Available uplink resources may be available PUCCH resources.

In another example, an available PUCCH resource may be a PUCCH resource in Set A and/or Set B and/or Set C.

An available PUCCH resource in Set A may be determined by methods specified in other descriptions of the disclosure to transmit the HARQ-ACK codebook including HARQ-ACK information only for SPS PDSCH reception(s) (for example, a delayed HARQ-ACK codebook including HARQ-ACK information only for SPS PDSCH reception(s)).

An available PUCCH resource in Set B may be determined by methods specified in other descriptions of the disclosure to transmit the HARQ-ACK codebook including HARQ-ACK information only for SPS PDSCH reception(s) (for example, a delayed HARQ-ACK codebook including HARQ-ACK information only for SPS PDSCH reception(s)).

An available PUCCH resource in Set C may be determined by methods specified in other descriptions of the disclosure to transmit the HARQ-ACK codebook including HARQ-ACK information only for SPS PDSCH reception(s) (for example, a delayed HARQ-ACK codebook including HARQ-ACK information only for SPS PDSCH reception(s)).

It may also be specified that the priority order of the UE selecting one set from the sets A, B and C is A, B, C from high to low. Alternatively, it may also be specified that the priority order of the UE selecting one set from the sets A, B and C is A, C, B from high to low. Alternatively, it may also be specified that the priority order of the UE selecting one set from the sets A, B and C is B, A, C from high to low. Alternatively, it may also be specified that the priority order of the UE selecting one set from the sets A, B and C is B, C, A from high to low. Alternatively, it may also be specified that the priority order of the UE selecting one set from the sets A, B and C is C, B, A from high to low. Alternatively, it may also be specified that the priority order of the UE selecting one set from the sets A, B and C is C, A, B from high to low.

The method specifies that the UE may select an available PUCCH from Set A, Set B or Set C, thus clarifying the behavior of the UE, and improving the transmission probability of the HARQ-ACK codebook including HARQ-ACK information only for SPS PDSCH reception(s) (for example, a delayed HARQ-ACK codebook including HARQ-ACK information only for SPS PDSCH reception(s)). It further reduces the HARQ-ACK transmission latency, reduces the probability of downlink data retransmission, reduces the user plane latency, and improves the spectrum efficiency of the network.

[Situation 8]

Available uplink resources may be available PUSCH resources.

For example, a PUSCH may be in at least one of the following sets.

Set E: a set composed of dynamically scheduled PUSCHs, which may also be referred to as a list of dynamically scheduled PUSCH resources.

Set F: a set composed of configured grant PUSCHs (for example, CG-PUSCHs), which may also be referred to as a list of configured grant PUSCH resources.

Set G: a set composed of PUSCHs dedicated for transmitting the HARQ-ACK codebook including HARQ-ACK information only for SPS PDSCH reception(s) (for example, a delayed HARQ-ACK codebook including HARQ-ACK information only for SPS PDSCH reception(s)), which may also be referred to as a list of PUSCH resources dedicated for transmitting the HARQ-ACK codebook including HARQ-ACK information only for SPS PDSCH reception(s). For example, a PUSCH dedicated for transmitting the HARQ-ACK codebook including HARQ-ACK information only for SPS PDSCH reception(s) (for example, a delayed HARQ-ACK codebook including HARQ-ACK information only for SPS PDSCH reception(s)), which may be a dynamically scheduled PUSCH and/or a configured grant PUSCH. For example, the PUSCH(s) may not include uplink data. For example, the PUSCH(s) may not include uplink data and other uplink control information.

[Situation 9]

Available uplink resources may be available PUSCH resources.

For example, if an uplink time unit for transmitting a HARQ-ACK codebook including HARQ-ACK information only for SPS PDSCH reception(s) (for example, a delayed HARQ-ACK codebook including HARQ-ACK information only for SPS PDSCH reception(s)) does not include any available PUCCH resources, a PUSCH may be scheduled by an uplink DCI format, and the HARQ-ACK codebook including HARQ-ACK information only for SPS PDSCH reception(s) (for example, a delayed HARQ-ACK codebook including HARQ-ACK information only for SPS PDSCH reception(s)) is multiplexed in the PUSCH for transmission. For example, available PUCCH resources may be PUCCH resources determined according to other descriptions of the disclosure. For example, the HARQ-ACK codebook including HARQ-ACK information only for SPS PDSCH reception(s) may be an undelayed HARQ-ACK codebook including HARQ-ACK information only for SPS PDSCH reception(s) and/or a delayed HARQ-ACK codebook including HARQ-ACK information only for SPS PDSCH reception(s). For example, an uplink DCI format may be DCI format 0_1, and/or DCI format 0_2, and/or DCI format 0_0. Whether to multiplex the HARQ-ACK codebook including HARQ-ACK information only for SPS PDSCH reception(s) may be dynamically indicated in the DCI format. Alternatively, whether to multiplex the delayed HARQ-ACK codebook including HARQ-ACK information only for SPS PDSCH reception(s) may be dynamically indicated in the DCI format. For example, it may be configured by higher layer signaling whether it may dynamically indicate in a specific DCI format whether to multiplex the HARQ-ACK codebook including HARQ-ACK information only for SPS PDSCH reception(s). For example, it may be configured by higher layer signaling whether it may dynamically indicate in a specific DCI format whether to multiplex the delayed HARQ-ACK codebook including HARQ-ACK information only for SPS PDSCH reception(s). For example, whether it may dynamically indicate in one or more DCI formats whether to multiplex the HARQ-ACK codebook including HARQ-ACK information only for SPS PDSCH reception(s) may be configured in a parameter, for example, by higher layer signaling. For example, whether it may dynamically indicate in one or more DCI formats whether to multiplex the delayed HARQ-ACK codebook including HARQ-ACK information only for SPS PDSCH reception(s) may be configured by higher layer signaling. The dynamic indication may be an explicit indication and/or an implicit indication. For example, a DCI format may use a new field to indicate the above manners, or reuse an existing field or reuse one or more bits to indicate the above manners.

For another example, the PUSCH(s) scheduled by the DCI format may or may not include uplink data.

[Situation 10]

Available uplink resources may be available PUSCH resources.

For example, if an uplink time unit for transmitting a HARQ-ACK codebook including HARQ-ACK information only for SPS PDSCH reception(s) (for example, a delayed HARQ-ACK codebook including HARQ-ACK information only for SPS PDSCH reception(s)) does not include any available PUCCH resources, the HARQ-ACK codebook including HARQ-ACK information only for SPS PDSCH reception(s) (for example, a delayed HARQ-ACK codebook including HARQ-ACK information only for SPS PDSCH reception(s)) may be multiplexed in a configured grant PUSCH (for example, a CG-PUSCH) for transmission. For example, available PUCCH resources may be PUCCH resources determined according to other descriptions of the disclosure. For example, the HARQ-ACK codebook including HARQ-ACK information only for SPS PDSCH reception(s) may be an undelayed HARQ-ACK codebook including HARQ-ACK information only for SPS PDSCH reception(s) and/or a delayed HARQ-ACK codebook including HARQ-ACK information only for SPS PDSCH reception(s). For example, whether to multiplex the HARQ-ACK codebook including HARQ-ACK information only for SPS PDSCH reception(s) may be configured through higher layer signaling (for example, the parameter A1). Alternatively, whether to multiplex the delayed HARQ-ACK codebook including HARQ-ACK information only for SPS PDSCH reception(s) may be configured through higher layer signaling (for example, the parameter A1 or the parameter A2). For example, the parameter A1 and/or the parameter A2 may be configured in a CG PUSCH configuration parameter (for example, the parameter ConfiguredGrantConfig). For example, the parameter A1 and/or parameter A2 may be configured for all CG PUSCH configurations, for example, the parameter A1 and/or parameter A2 may be configured in parameter BWP-UplinkDedicated.

For another example, the CG-PUSCH(s) may or may not include uplink data. With respect to CG-PUSCH(s) not including uplink data, whether to multiplex the HARQ-ACK codebook including HARQ-ACK information only for SPS PDSCH reception(s) in the PUSCH(s) not including uplink data may be configured through higher layer signaling (for example, the parameter A3). Alternatively, whether to multiplex the delayed HARQ-ACK codebook including HARQ-ACK information only for SPS PDSCH reception(s) in the PUSCH(s) not including uplink data may be configured through higher layer signaling (for example, the parameter A3 or the parameter A4). For example, the parameter A3 and/or the parameter A4 are configured in parameter ConfiguredGrantConfig.

[Situation 11]

Available uplink resources may be available PUSCH resources.

For example, if an uplink time unit for transmitting a HARQ-ACK codebook including HARQ-ACK information only for SPS PDSCH reception(s) (for example, a delayed HARQ-ACK codebook including HARQ-ACK information only for SPS PDSCH reception(s)) does not include any available PUCCH resource, the HARQ-ACK codebook including HARQ-ACK information only for SPS PDSCH reception(s) (for example, a delayed HARQ-ACK codebook including HARQ-ACK information only for SPS PDSCH reception(s)) may be multiplexed in a PUSCH scheduled by a uplink DCI format or a CG-PUSCH for transmission. For example, it may also be specified that the UE preferentially selects PUSCH(s) scheduled by DCI format(s), or the UE preferentially selects CG-PUSCH(s).

For another example, whether the UE may use PUSCH(s) in Set E and/or Set F and/or Set G to transmit the HARQ-ACK codebook including HARQ-ACK information only for SPS PDSCH reception(s) (for example, a delayed HARQ-ACK codebook including HARQ-ACK information only for SPS PDSCH reception(s)) may also be determined according to the UE capability. For example, the UE may report (or transmit) a capability that supports using the dynamically scheduled PUSCH(s) and/or CG-PUSCH(s) and/or the PUSCH(s) dedicated for transmitting the HARQ-ACK codebook including HARQ-ACK information only for SPS PDSCH reception(s) (for example, a delayed HARQ-ACK codebook including HARQ-ACK information only for SPS PDSCH reception(s)) to transmit the HARQ-ACK codebook including HARQ-ACK information only for SPS PDSCH reception(s) (for example, a delayed HARQ-ACK codebook including HARQ-ACK information only for SPS PDSCH reception(s)). For example, the UE may report (or transmit) a capability that supports using a PUSCH in Set E and/or Set F and/or Set G to transmit the HARQ-ACK codebook including HARQ-ACK information only for SPS PDSCH reception(s) (for example, a delayed HARQ-ACK codebook including HARQ-ACK information only for SPS PDSCH reception(s)). For another example, after receiving the report of the capability of the UE, the base station may configure the UE by higher layer signaling to use PUSCH(s) in one or more specific sets to transmit the HARQ-ACK codebook including HARQ-ACK information only for SPS PDSCH reception(s) (for example, a delayed HARQ-ACK codebook including HARQ-ACK information only for SPS PDSCH reception(s)).

The method specifies that the UE may also select a PUSCH from Set E and/or Set F and/or Set G, thus clarifying the behavior of the UE, and improving the transmission probability of the HARQ-ACK codebook including HARQ-ACK information only for SPS PDSCH reception(s) (for example, a delayed HARQ-ACK codebook including HARQ-ACK information only for SPS PDSCH reception(s)). It further reduces the HARQ-ACK transmission latency, reduces the probability of downlink data retransmission, reduces the user plane latency, and improves the spectrum efficiency of the network.

For a given HARQ process, the UE does not expect to receive, another PDSCH of the HARQ process before the end of the transmission (for example, an expected HARQ-ACK transmission, or an actual HARQ-ACK transmission) of HARQ-ACK for a PDSCH of the HARQ process. As for a SPS PDSCH configuration, the SPS PDSCH reception(s) are periodic, if the delay time of the HARQ-ACK codebook including HARQ-ACK information only for SPS PDSCH reception(s) (for example, a delayed HARQ-ACK codebook including HARQ-ACK information only for SPS PDSCH reception(s)) is too long, the UE will receive another PDSCH of the same HARQ process before the end of HARQ-ACK feedback for the PDSCH. The UE may consider it to be an error scheduling. In order to solve this problem, the following methods may be adopted.

For example, it may be specified by a protocol that for a given HARQ process, if the UE receives another SPS PDSCH of the HARQ process before the end of the transmission of HARQ-ACK for a SPS PDSCH of the HARQ process (for example, an expected HARQ-ACK transmission, for another example, an actual HARQ-ACK transmission), the UE considers the SPS PDSCH received later as an empty SPS PDSCH. The UE considers that the base station did not transmit the SPS PDSCH received later. It may be further specified that the UE does not need to feed back HARQ-ACK for the SPS PDSCH received later. Alternatively, the UE needs to feed back HARQ-ACK for the SPS PDSCH received later. If the UE does not transmit other HARQ-ACK information in an uplink time unit, the UE does not feed back HARQ-ACK for the SPS PDSCH received later.

The method clarifies the behavior of the UE, avoids that UE considers it to be a wrong scheduling, improves the reliability of data transmission, reduces the user plane latency, and improves the spectrum efficiency of the network.

For example, it may be specified by a protocol that for a given HARQ process, if the UE receives another SPS PDSCH of the HARQ process before the end of the transmission of HARQ-ACK for SPS PDSCH of the HARQ process (for example, an expected HARQ-ACK transmission, or an actual HARQ-ACK transmission), the UE does not transmit the HARQ-ACK information for the former SPS PDSCH, or the UE does not transmit the HARQ-ACK codebook including the former SPS PDSCH. UE clears a HARQ buffer of the former SPS PDSCH.

The method clarifies the behavior of the UE, avoids that UE considers it to be a wrong scheduling, improves the reliability of data transmission, reduces the user plane latency, and improves the spectrum efficiency of the network.

For example, a specific parameter may be configured by higher layer signaling to indicate a maximum latency W. A specific parameter may be configured in parameter PUCCH-Config, and/or parameter BWP-UplinkDedicated, and/or parameter SPS-Config to indicate the maximum latency. The maximum latency may be defined as the maximum time interval between the time when the HARQ-ACK for the SPS PDSCH(s) is actually transmitted and the end position of the received SPS PDSCH(s). For example, the time interval may be in units of slots, and/or sub-slots, and/or milliseconds. The maximum latency may also be defined as the maximum value of the time interval K1 between the time when the HARQ-ACK for the SPS PDSCH(s) is actually transmitted and the time when the HARQ-ACK is expected to be transmitted (for example, the time when the HARQ-ACK is expected to be transmitted may be an uplink time unit resulted after K1 is added to the uplink time unit overlapping with the end position of the received SPS PDSCH(s), and K1 may be indicated in an activation DCI of the SPS PDSCH). For example, the time interval may be in units of slots, and/or sub-slots, and/or milliseconds.

For example, the maximum latency configured by higher layer signaling needs to satisfy the following restriction: for a given HARQ process, the UE does not expect to receive another PDSCH of the HARQ process before the end of the transmission of HARQ-ACK for PDSCH of the HARQ process (for example, an actual HARQ-ACK transmission).

For example, the maximum latency configured by higher layer signaling may not be greater than the maximum latency Ymax supported by the capability reported by the UE. Ymax may be in units of uplink slots or downlink slots, or uplink sub-slots or milliseconds. Ymax may be reported per UE, Ymax may also be reported per priority, and Ymax may also be reported per carrier. For another example, if the unit of the maximum latency Ymax supported by the capability reported by the UE is different from the unit of the maximum latency configured by the higher layer signaling, it needs to be satisfied that the absolute time of the maximum latency configured by the higher layer signaling is not greater than the absolute time of the maximum latency Ymax supported by the capability reported by the UE.

For example, the maximum latency may also be determined by a formula. The maximum latency may be the minimum of the maximum latencies configured for all SPS PDSCHs. For another example, for a priority, the maximum latency may be the minimum of the maximum latencies configured for all SPS PDSCHs with the priority.

For example, a SPS PDSCH has a period of P and a number of HARQ processes is N. A maximum latency Wi configured for the SPS PDSCH (the maximum time interval between the time when the HARQ-ACK for the SPS PDSCH is actually transmitted and the end position of the received SPS PDSCH) may be calculated by the following formula.

$$Wi = N \times P$$

$$Wi = \lfloor N \times P \times 2^{\mu_{PUCCH} - \mu_{PDSCH}} \rfloor, \text{ where } \mu_{PDSCH} \text{ and } \mu_{PDCCH} \text{ are}$$

subcarrier spacing configuration of PDSCH(s) and PUCCH(s) respectively.

Alternatively, $Wi = N \times P - K1$, where K1 is a HARQ-ACK feedback time interval indicated in an activation DCI of the SPS PDSCH configuration.

Alternatively, $Wi = \lfloor N \times P \times 2^{\mu_{PUCCH} - \mu_{PDSCH}} \rfloor - K1$ Alternatively, $Wi = \lfloor N \times P \times 2^{\mu_{PUCCH} - \mu_{PDSCH}} \rfloor - \alpha$, where $\alpha$ may be specified by a protocol or configured by higher layer signaling, and $\alpha$ may be an integer.

Alternatively, $Wi = \lfloor N \times P \times 2^{\mu_{PUCCH} - \mu_{PDSCH}} - \beta \rfloor$, where $\beta$ may be specified by a protocol or configured by higher layer signaling, and $\beta$ may be an integer or rational number.

The method clarifies the behavior of the UE, avoids that UE considers it to be a wrong scheduling, improves the reliability of data transmission, reduces the user plane latency, and improves the spectrum efficiency of the network.

In a TDD system, if the UE does not transmit a HARQ-ACK codebook including HARQ-ACK information only for SPS PDSCH reception(s) for various reasons, for example, if one or more symbols in an uplink time unit used by the UE to transmit the HARQ-ACK codebook including HARQ-ACK information only for SPS PDSCH reception(s) are configured as downlink by higher layer signaling, or one or more symbols in the uplink time unit are indicated as downlink by dynamic signaling so that the HARQ-ACK codebook including HARQ-ACK information only for SPS PDSCH reception(s) cannot be transmitted, transmission of the HARQ-ACK codebook including HARQ-ACK information only for SPS PDSCH reception(s) may be delayed.

The aforementioned HARQ-ACK codebook including HARQ-ACK information only for SPS PDSCH reception(s) may be a HARQ-ACK codebook of HARQ-ACK information for one or more SPS PDSCH receptions.

In addition, the aforementioned HARQ-ACK codebook including HARQ-ACK information only for SPS PDSCH reception(s) may be, for example, a HARQ-ACK codebook including HARQ-ACK information only for SPS PDSCH reception(s) that needs to be delayed due to various reasons, or a HARQ-ACK codebook including HARQ-ACK information only for SPS PDSCH reception(s) that has not been transmitted and/or cancelled.

The aforementioned HARQ-ACK codebook including HARQ-ACK information only for SPS PDSCH reception(s)

that has not been transmitted and/or cancelled may occur for the following reasons: if PUCCH(s) carrying the HARQ-ACK codebook for HARQ-ACK information for the SPS PDSCH(s) overlaps with a set of symbols which are indicated as downlink symbols and/or flexible symbols by higher layer signaling (for example, the parameter tdd-UL-DL-ConfigurationCommon or the parameter tdd-UL-DL-ConfigurationDedicated) and/or DCI (for example, dynamic DFI), the UE does not transmit and/or cancel transmitting HARQ-ACK for the SPS PDSCH(s). However, the reason why the HARQ-ACK codebook including HARQ-ACK information only for SPS PDSCH reception(s) that has not been transmitted and/or cancelled occurs is not limited thereto.

The UE may receive an indication as to whether transmission of the HARQ-ACK codebook including HARQ-ACK information only for SPS PDSCH reception(s) can be delayed from the base station. That is, the downlink data and/or downlink control signaling described above in step 201 of FIG. 2B may be an indication as to whether transmission of the HARQ-ACK codebook including HARQ-ACK information only for SPS PDSCH reception(s) can be delayed.

The base station may transmit the indication through higher layer signaling (for example, a specified parameter). For example, the specified parameter may be configured in parameter PUCCH-Config, and/or parameter BWP-UplinkDedicated, and/or parameter SPS-Config. Additionally or alternatively, the base station may transmit the indication through DCI (for example, uplink DCI and downlink DCI).

The following illustrates the indication as to whether transmission of the HARQ-ACK codebook including HARQ-ACK information only for SPS PDSCH reception(s) can be delayed transmitted from the base station to the UE by examples.

For example, the indication may be used by the base station to indicate to the UE whether the UE may delay the transmission of the HARQ-ACK codebook including HARQ-ACK information only for SPS PDSCH reception(s). In this case, the base station may indicate by 1 bit for example.

For another example, the indication may be used by the base station to indicate to the UE whether the UE may delay the HARQ-ACK codebook including HARQ-ACK information only for SPS PDSCH reception(s) to the first and/or the next available uplink resource for transmission. The next available uplink resource may be an available PUCCH resource and/or an available PUSCH resource.

For another example, the indication may be used by the base station to indicate to the UE whether the UE may delay the HARQ-ACK codebook including HARQ-ACK information only for SPS PDSCH reception(s) to the first and/or the next available uplink resource for transmission, and whether the UE may multiplex the delayed HARQ-ACK codebook including HARQ-ACK information only for SPS PDSCH reception(s) and HARQ-ACK information for at least one SPS PDSCH whose HARQ-ACK information transmission is not delayed on the first and/or next available uplink resource (for example, a same PUCCH resource and/or a same PUSCH resource) for transmission.

For another example, the indication may be used by the base station to indicate to the UE whether the UE may delay the HARQ-ACK codebook including HARQ-ACK information only for SPS PDSCH reception(s) to the first and/or the next available uplink resource for transmission, and whether the UE may multiplex the delayed HARQ-ACK codebook including HARQ-ACK information only for SPS PDSCH reception(s) and HARQ-ACK information for at least one SPS PDSCH whose HARQ-ACK information transmission is not delayed and/or at least one dynamically scheduled PDSCH and/or at least one DCI on the first and/or the next available uplink resource (for example, a same PUCCH resource and/or a same PUSCH resource) for transmission.

The aforementioned at least one dynamically scheduled PDSCH may be, for example, a PDSCH scheduled by a DCI format. For example, the aforementioned at least one dynamically scheduled PDSCH may include the first activated SPS PDSCH. The aforementioned at least one DCI may be, for example, a DCI indicating SPS PDSCH release(s) and, for another example, a DCI indicating secondary cell dormancy.

The above lists several examples of the indication as to whether transmission of the HARQ-ACK codebook including HARQ-ACK information only for SPS PDSCH reception(s) can be delayed transmitted from the base station to the UE. However, the indication is not limited to the above examples. The aforementioned HARQ-ACK codebook including HARQ-ACK information only for SPS PDSCH reception(s) may be, for example, a HARQ-ACK codebook including HARQ-ACK information only for SPS PDSCH reception(s) that needs to be delayed due to various reasons, or a HARQ-ACK codebook including HARQ-ACK information only for SPS PDSCH reception(s) that has not been transmitted and/or cancelled.

The above indication may be determined by the base station based on the UE capability. Additionally or alternatively, the base station may determine the above indication by other means. The UE capability may be reported or transmitted by the UE to the base station. Additionally or alternatively, the base station may learn the UE capability by other means.

Particularly, for example, the UE may report (or transmit) a capability that supports delaying the transmission of the HARQ-ACK codebook including HARQ-ACK information only for the SPS PDSCH(s).

For another example, the UE may report (or transmit) a capability that supports delaying the transmission of the HARQ-ACK codebook including HARQ-ACK information only for the SPS PDSCH(s) to the first and/or the next available uplink resource (for example, PUCCH(s) and/or PUSCH(s)).

For another example, the UE may report (or transmit) a capability that supports multiplexing the HARQ-ACK codebook including HARQ-ACK information only for the SPS PDSCH(s) and the HARQ-ACK information for at least one SPS PDSCH whose HARQ-ACK information transmission is not delayed on a same available uplink resource (for example, a PUCCH and/or a PUSCH) for transmission.

For another example, the UE may report (or transmit) a capability that supports multiplexing the HARQ-ACK codebook including HARQ-ACK information only for the SPS PDSCH(s) and HARQ-ACK information for at least one SPS PDSCH whose HARQ-ACK information transmission is not delayed and/or dynamically scheduled PDSCH(s) and/or DCI(s) on a same available uplink resource (for example, a PUCCH and/or a PUSCH).

The UE capability reporting listed above may be applicable to all HARQ-ACK codebook types (including but not limited to semi-static codebook, dynamic codebook and enhanced dynamic codebook, and a codebook type described above with pseudo code-1), or the UE capability reporting is for one or more specific HARQ-ACK codebook types. For example, a specific HARQ-ACK codebook type may be semi-static, or dynamic, or enhanced dynamic, or the codebook type described above in connection with pseudo code-1.

The UE may determine whether to delay the transmission of the HARQ-ACK codebook including HARQ-ACK information only for SPS PDSCH reception(s) to the next available uplink resource based on the indication received from the base station as to whether the transmission of the HARQ-ACK codebook including HARQ-ACK information only for SPS PDSCH reception(s) can be delayed. That is, that the UE determines uplink data and/or uplink control signaling, as well as an uplink time unit and/or an uplink physical channel for transmitting the uplink data and/or uplink control signaling based on the downlink data and/or downlink control signaling described above in step 202 may be that: the UE determines whether to delay the transmission of the HARQ-ACK codebook including HARQ-ACK information only for SPS PDSCH reception(s) to the next available uplink resource based on the indication received from the base station as to whether the transmission of the HARQ-ACK codebook including HARQ-ACK information only for SPS PDSCH reception(s) can be delayed.

For example, the UE may delay the HARQ-ACK codebook including HARQ-ACK information only for SPS PDSCH reception(s) to the first and/or the next available uplink resource, and multiplex the HARQ-ACK codebook including HARQ-ACK information only for SPS PDSCH reception(s) and HARQ-ACK information for at least one SPS PDSCH whose HARQ-ACK information transmission is not delayed on the first and/or next available uplink resource (for example, a same PUCCH and/or a same PUSCH) for transmission. For example, the UE may delay the HARQ-ACK codebook including HARQ-ACK information only for SPS PDSCH reception(s) to the first and/or the next available uplink resource, and multiplex the HARQ-ACK codebook including HARQ-ACK information only for SPS PDSCH reception(s) and HARQ-ACK information for at least one SPS PDSCH whose HARQ-ACK information transmission is not delayed and/or at least one dynamically scheduled PDSCH and/or at least one DCI on the first and/or the next available uplink resource (for example, a same PUCCH and/or a same PUSCH) for transmission.

If the HARQ-ACK information for one or more SPS PDSCHs is delayed to an uplink time unit for transmission, and the uplink time unit is also expected to transmit HARQ-ACK information for other SPS PDSCHs (for example, HARQ-ACK information for SPS PDSCHs which are not delayed) and optionally HARQ-ACK information for one or more dynamically scheduled PDSCHs and/or DCIs, the HARQ-ACK information may be multiplexed on a same uplink resource (for example, a PUCCH and/or PUSCH) for transmission. The following modes (Mode 1, Mode 2 and Mode 3) may be adopted for multiplexing.

[Mode 1]

Mode 1 may be applicable to the case where the HARQ-ACK information transmitted by a same uplink resource includes HARQ-ACK information only for SPS PDSCH(s) (delayed HARQ-ACK information for one or more SPS PDSCHs and HARQ-ACK information for one or more SPS PDSCHs expected to be transmitted on a same uplink resource). For example, the same uplink resource may be a resource in the aforementioned Set C, but is not limited thereto. Mode 2 may also be applicable to other situations.

In Mode 1, for example, it is assumed that $$N_c^{DL}$$

in is the number of DL slots of the serving cell c in pseudo code-1, and HARQ-ACK information for SPS PDSCHs in the DL slots is multiplexed in a PUCCH. The HARQ-ACK information multiplexed in the PUCCH relates to one or more SPS PDSCHs determined according to K1 (as mentioned above, K1 is the time interval between the time when the HARQ-ACK for the SPS PDSCH(s) is actually transmitted and the time when the HARQ-ACK is expected to be transmitted) with respect to the PUCCH and one or more SPS PDSCHs delayed for transmission on the PUCCH.

[Mode 2]

Mode 2 may be applicable to the case where the first and/or the next available uplink resource is configured for transmission of a semi-static HARQ-ACK codebook (for example, Type-1 HARQ-ACK codebook in 3GPP TS 38.213), for example, the case where the PDSCH HARQ-ACK codebook configuration parameter (for example, the parameter pdsch-HARQ-ACK-Codebook) is configured to be semi-static (for example, semiStatic) so that the UE generates a HARQ-ACK codebook according to a rule for the semi-static HARQ-ACK codebook. However, Mode 2 may also be applicable to other situations. Compared with Mode 1, in Mode 2, the HARQ-ACK information transmitted by the same uplink resource may not only include HARQ-ACK information for SPS PDSCH(s) (for example, delayed HARQ-ACK information for SPS PDSCH and/or undelayed HARQ-ACK information for SPS PDSCH(s)), but also include HARQ-ACK information for dynamically scheduled PDSCH(s) and/or DCI(s). In Mode 2, the UE needs to enhance the existing (for example, Rel-15 and/or Rel-16) semi-static HARQ-ACK codebook.

Specifically, K1 is used to indicate a slot timing value associated with the uplink active bandwidth part (BWP) of the semi-static HARQ-ACK codebook, and Kset is used to indicate a set of K1. The UE may determine downlink channel candidates corresponding to the HARQ-ACK information in the semi-static HARQ-ACK codebook through each value of K1. The downlink channel candidates may include SPS PDSCH(s), and/or dynamically scheduled PDSCH(s) and/or DCI(s). The specific de-termination method can be seen in the method for generating Type-1 HARQ-ACK codebook described in 3GPP TS 38.213 (for example, Rel-15 and/or Rel-16), which will not be described in detail here.

Mode 2 will be described in detail with specific examples below. At first, for convenience of explanation, it is assumed that the number of SPS PDSCHs whose HARQ-ACK information is delayed is one. For example, it is assumed that the time interval between the SPS PDSCH and the first and/or the next available uplink resource is 5 slots. For example, it is assumed that a period of a SPS PDSCH configuration is one slot, a PDSCH-to-HARQ feedback timing indication field in a DCI activating the SPS PDSCH configuration indicates 1, the time unit of PUCCH(s) is a slot, and the uplink and downlink frame structure from slot 0 to slot 9 is DDDDDUUUUU, where D represents downlink and U represents uplink, and it is assumed that the downlink channel transmitted on each of slots 0-4 has only SPS PDSCH(s), however, this is only for convenience of explanation, and this method is also applicable to the case where the downlink channel transmitted on at least one of slots 0-4 also includes dynamically scheduled PDSCH(s) and/or DCI(s). At this time, for SPS PDSCH(s) transmitted on slot 2, UE cannot transmit HARQ-ACK codebook including HARQ-ACK information only for the SPS PDSCH(s) on slot 3 determined by the PDSCH-to-HARQ feedback timing indication field, because the frame structure of slot 3 is D. Therefore, the UE may delay the transmission of the HARQ-ACK codebook including the HARQ-ACK information only for the SPS PDSCH(s), which is supposed to be transmitted on slot 3. According to the uplink and downlink frame structure, the first appearing uplink slot after slot 3 is slot 5. It is assumed that the set of K1 for generating the semi-static HARQ-ACK codebook for slot 5 is {1, 2, 3, 4}, it can be known that the slots where the downlink channels whose HARQ-ACK information may be fed back on slot 5 are located contain: 5−1=4, 5−2=3, 5−3=2, and 5−4=1, i.e., {1, 2, 3, 4}. That is, the set of downlink channel candidates for transmitting HARQ-ACK information in a semi-static manner on slot 5 is {SPS-PDSCH(s) transmitted on slot 1, SPS-PDSCH transmitted on slot 2, SPS-PDSCH(s) transmitted on slot 3, SPS-PDSCH(s) transmitted on slot 4}. According to the foregoing assumption, the downlink channel transmitted on each of slots 1, 2, 3, and 4 includes only SPS PDSCH(s), however, the disclosure is not limited thereto, and the downlink channel transmitted on at least one of slots 1, 3, and 4 may also include dynamically scheduled PDSCH(s) and/or DCI(s). The set includes SPS PDSCH(s) transmitted on slot 2. Therefore, it may be possible to delay the HARQ codebook including the HARQ-ACK information only for the SPS PDSCH(s) transmitted on slot 2, in order to transmit it on slot 5. At this time, the method of generating the semi-static HARQ-ACK codebook on the uplink resource on slot 5 may be obtained by referring to the method of generating the Type-1 HARQ-ACK codebook described in 3GPP TS 38.213 (for example, Rel-15 and/or Rel-16).

It should be noted that SPS PDSCH(s) whose HARQ-ACK information is delayed for transmission may belong to downlink channel candidate sets of more than one uplink resources. Continuing with the previous examples, it is assumed that the set of K1 for generating the semi-static HARQ-ACK codebook for slot 6 is {3, 4}, then the set of downlink channel candidates for transmitting HARQ-ACK information in a semi-static manner on slot 6 is {SPS-PDSCH(s) transmitted on slot 2, SPS-PDSCH(s) transmitted on slot 3}, which also includes SPS-PDSCH(s) transmitted on slot 2. According to the foregoing assumption, the downlink channel transmitted on each of slots 2 and 3 includes only SPS PDSCH(s), however, the disclosure is not limited thereto, and the downlink channel transmitted on slot 3 may also include dynamically scheduled PDSCH(s) and/or DCI(s). Therefore, the UE needs to determine whether to delay its HARQ-ACK information to be transmitted on the uplink resource on slot 5 or slot 6 according to predetermined methods and/or rules and/or configurations.

The above predetermined methods and/or rules and/or configurations may be as follows:

For example, the base station may indicate, with a specified parameter (for example, K1'), the value of a time interval K1' between the transmission time of SPS PDSCH(s) and the actual transmission time of its HARQ-ACK information to the UE. In a case where transmission of HARQ-ACK information for the SPS PDSCH(s) cannot be delayed, K1'=a value indicated by the PDSCH-to-HARQ feedback timing indication field in DCI. Otherwise, in a case where the HARQ-ACK information for the SPS PDSCH(s) can be delayed, K1'=a value greater than the value indicated by the PDSCH-to-HARQ feedback timing indication field in DCI. Therefore, when K1' of SPS PDSCH(s) transmitted on slot 2 where HARQ-ACK information is delayed for transmission is set to 4, UE reports NACK as HARQ-ACK information for the SPS PDSCH(s) in the semi-static HART-ACK codebook of slot 5 indicated by Kr, and reports ACK as HARQ-ACK information for the SPS PDSCH(s) in the semi-static HART-ACK codebook of slot 6 which is not indicated by Kr.

The base station may select one or more values from the sets of K1 of different slots as possible values of Kr, which may be specified by a protocol or configured by higher layer signaling. As described above, the base station may select '4' of the set $\{1, 2, 3, 4\}$ of K1 for generating the semi-static HARQ-ACK codebook of slot 5 as the value of Kr.

Alternatively, the base station may select one or more values different from the values in the sets of K1 of respective slots as possible values of Kr, and expand the sets of K1 of respective slots to include the possible values of Kr. This can be specified by a protocol or configured by higher layer signaling. For example, the value of K1' may be the possible value of K1' determined according to the current slot. Alternatively, the value of K1' may be the possible value of K1' determined for any slot. For example, the base station may set K1'=5 for the SPS PDSCH(s) transmitted on slot 0, so that the set of K1 for generating the semi-static HARQ-ACK codebook for slot 5 is expanded from $\{1, 2, 3, 4\}$ to $\{1, 2, 3, 4, 5\}$, so that the UE can transmit the HARQ-ACK information for SPS PDSCH(s) transmitted on slot 0 on the uplink resource of slot 5.

For another example, the UE may determine on which uplink resource the HARQ-ACK codebook including the HARQ-ACK information only for the SPS PDSCH(s) is delayed for transmission according to the rules agreed in advance between the base station and the UE. For example, the base station and the UE may agree in advance to delay the transmission to the first appearing uplink resource that can transmit the delayed HARQ-ACK codebook including the HARQ-ACK information only for the SPS PDSCH(s). With this method, UE reports ACK as HARQ-ACK information for the SPS PDSCH(s) in the semi-static HART-ACK codebook of slot 5, and reports NACK as HARQ-ACK information for the SPS PDSCH(s) in the semi-static HART-ACK codebook of slot 6.

It should also be noted that the UE may not necessarily be able to transmit a delayed codebook including HARQ-ACK information only for SPS PDSCH(s) on the first appearing uplink resource, that is, a case where the SPS PDSCH(s) does not belong to the downlink channel candidate set of the first appearing uplink resource may occur. With continued reference to the previous examples, for SPS PDSCH(s) transmitted on slot 0, it is assumed that the PDSCH-to-HARQ feedback timing indication field in DCI indicates 1, since slot 1 is downlink, HARQ-ACK information for SPS PDSCH(s) transmitted on slot 0 cannot be transmitted in uplink resources of slot 1. At first, the available uplink resource appearing first after slot 1, that is, the uplink resource of slot is considered, since SPS PDSCH(s) transmitted on slot 0 does not belong to the set of downlink channel candidates for transmitting HARQ-ACK information in a semi-static manner on slot 5, it is impossible to delay the HARQ-ACK information for the SPS PDSCH(s) transmitted on slot 0 to uplink resources of slot 5.

In this case, the UE may consider the available uplink resource that appears first after slot 5, that is, the uplink resource of slot 6, since SPS PDSCH(s) transmitted on slot 0 does not belong to the set of downlink channel candidates for transmitting HARQ-ACK information in a semi-static manner on slot 6, it is impossible to delay the HARQ-ACK information for the SPS PDSCH(s) transmitted on slot 0 to uplink resources of slot 6. Then, the UE may then consider the available uplink resource that appears first after slot 6, that is, the uplink resource of slot 7, it is assumed that the set of K1 for generating semi-static HARQ-ACK codebook of slot 7 is $\{6, 7\}$, then the set of downlink channel candidates for transmitting HARQ-ACK information in a semi-static manner on slot 7 is {SPS-PDSCH(s) transmitted on slot 0, SPS-PDSCH(s) transmitted on slot 1}. Therefore, it may be possible for the UE to transmit a semi-static HARQ-ACK codebook including HARQ-ACK information for SPS PDSCH(s) transmitted on slot 0 on the uplink resource of slot 7.

[Mode 3]

For another example, HARQ-ACK sub-codebooks may be generated respectively according to different time units expected for feeding back HARQ-ACK information, and then the HARQ-ACK sub-codebooks are combined into a HARQ-ACK codebook chronologically and transmitted in a same uplink resource. Herein, the HARQ-ACK information delayed to be transmitted in the uplink resource may be generated for the SPS PDSCH(s) by one of a dynamic HARQ-ACK codebook generation method, an enhanced dynamic HARQ-ACK codebook generation method, a semi-static HARQ-ACK codebook generation method, or a generation method of HARQ-ACK codebook including HARQ-ACK information only for SPS PDSCH(s) described in conjunction with pseudo code-1. Also, herein, the HARQ-ACK information expected to be transmitted in the uplink resource (i.e., undelayed) may be generated for the SPS PDSCH(s) and/or dynamically scheduled PDSCH(s) and/or DCI(s) by one of a dynamic HARQ-ACK codebook generation method, an enhanced dynamic HARQ-ACK codebook generation method, a semi-static HARQ-ACK codebook generation method, or a generation method of HARQ-ACK codebook including HARQ-ACK information only for SPS PDSCH(s) described in conjunction with pseudo code-1. Herein, a delayed HARQ-ACK sub-codebook may only include HARQ-ACK information for SPS PDSCH(s), while an undelayed HARQ-ACK sub-codebook may include HARQ-ACK information for SPS PDSCH and/or dynamically scheduled PDSCH(s) and/or DCI(s). Next, for convenience of explanation, it is assumed that the HARQ-ACK sub-codebook includes HARQ-ACK information only for SPS PDSCH(s). For example, slot 0 of a primary serving cell is a downlink slot, and the HARQ-ACK sub-codebook including only SPS PDSCH reception expected to be transmitted in slot 0 is 2 bits, which are ACK and ACK respectively. Slot 1 of the primary serving cell is a downlink slot, and the HARQ-ACK sub-codebook including only SPS PDSCH reception expected to be transmitted in slot 1 is 1 bit, which is NACK. Slot 2 of the primary serving cell is an uplink slot, and the HARQ-ACK sub-codebook including only SPS PDSCH reception of slot 2 is 1 bit, which is ACK. HARQ-ACK sub-codebooks of slot 0 and slot 1 may be delayed and transmitted on slot 2. A size of the HARQ-ACK codebook is 4 bits, which are ACK, ACK, NACK and ACK respectively. The first two bits are the HARQ-ACK sub-codebook of slot 0, the third bit is the HARQ-ACK sub-codebook of slot 1 and the fourth bit is the HARQ-ACK sub-codebook of slot 2. HARQ-ACK sub-codebooks may also be sorted in reverse time order or in other orders.

For another example, a delayed HARQ-ACK sub-codebook may be multiplexed with an undelayed HARQ-ACK sub-codebook in a PUCCH and/or PUSCH for transmission after compression. For example, the delayed HARQ-ACK sub-codebook may be compressed into 1 bit. For example, if all HARQ-ACK bits are ACK, ACK is fed back; otherwise, NACK is fed back. However, this is only one example of the compression manner, and the compression manner is not limited thereto. For another example, each SPS PDSCH configuration of the delayed HARQ-ACK sub-codebook may be compressed into 1 bit. If all HARQ-ACK bits of a SPS PDSCH configuration are ACK, ACK is fed back; otherwise, NACK is fed back. However, this is only one example of the compression manner, and the compression manner is not limited thereto.

The method clarifies the behavior of the UE, makes the understanding of the HARQ-ACK codebook by the UE and the base station consistent, and improves the reliability of the transmission of the HARQ-ACK codebook.

It should be noted that the solution for that PUCCH(s) and/or PUSCH(s) transmissions overlap with semi-statically configured downlink symbols in time domain in the disclosure is also applicable to scenarios where PUCCH and/or PUSCH transmissions overlap with SSB and/or CORESET0 in time domain. Symbols where SSB and/or CORESET0 are located may be considered as symbols that are semi-statically configured as downlink.

It should be noted that the feedback method of HARQ-ACK for SPS PDSCH(s) in the embodiments of the disclosure may be applicable to unicast SPS and/or groupcast (or multicast)/broadcast SPS.

In some implementations, if a PUCCH carrying HARQ-ACK overlaps with one or more other PUCCHs and/or PUSCHs in time domain, the PUCCH carrying HARQ-ACK and the one or more other PUCCHs and/or PUSCHs may be multiplexed in an uplink physical channel (for example, the uplink physical channel may be PUCCH(s) or PUSCH(s)). For example, the HARQ-ACK may be a HARQ-ACK codebook including HARQ-ACK information only for SPS PDSCH reception(s). It can be decided whether the UE satisfies a predefined Condition X through specification of protocols and/or configuration of higher layer signaling. For example, the condition X may be at least one of the conditions defined in other embodiments of the disclosure. If the predefined Condition X is satisfied, transmission of the HARQ-ACK is delayed (for example, the HARQ-ACK is delayed to the next available resource and/or available time unit according to the methods specified in other embodiments of the disclosure, for example, the time unit may be a slot/sub-slot). If the predefined Condition X is not satisfied, that the UE transmits the HARQ-ACK and/or the UE does not transmit the HARQ-ACK may be specified by a protocol and/or configured by higher layer signaling. The method provides a way for deciding the delayed transmission of HARQ-ACK, clarifies the behavior of the UE, keeps the understanding of the UE and the base station about whether to delay the transmission of HARQ-ACK consistent, and improves the reliability of HARQ-ACK transmission.

In an example, it can be decided whether the UE satisfies a predefined Condition A through specification of protocols and/or configuration of higher layer signaling. For example, the predefined Condition A may be a condition for HARQ-ACK delayed transmission. For example, the HARQ-ACK may be a HARQ-ACK codebook including HARQ-ACK information only for SPS PDSCH reception(s). If the predefined Condition A is satisfied, transmission of the HARQ-ACK is delayed (for example, the HARQ-ACK is delayed to the next available resource and/or available time unit according to the methods specified in other embodiments of the disclosure, for example, the time unit may be a slot/sub-slot). If the predefined Condition A is not satisfied, that the UE transmits the HARQ-ACK and/or the UE does not transmit the HARQ-ACK may be specified by a protocol and/or configured by higher layer signaling. For example, the predefined Condition A may be at least one of the following conditions: Condition 3: at least one symbol in the PUCCH carrying the HARQ-ACK is configured by higher layer signaling and/or indicated by dynamic SFI as a downlink symbol and/or a flexible symbol. For example, the PUCCH may be a HARQ-ACK codebook including HARQ-ACK information only for SPS PDSCH reception(s) and/or SR(s) and/or CSI.

Condition 4: at least one symbol in the PUSCH carrying the HARQ-ACK is configured by higher layer signaling and/or indicated by dynamic SFI as a downlink symbol and/or a flexible symbol.

Condition 5: the HARQ-ACK is a HARQ-ACK with lower priority, and the PUCCH and/or PUSCH carrying the HARQ-ACK overlap with PUSCH(s) and/or PUSCH(s) with higher priority in time domain.

Condition 6: at least one symbol in the PUCCH and/or PUSCH carrying the HARQ-ACK is indicated as transmission cancellation by an Uplink Cancellation Indication (ULCI).

Condition 7: the PUCCH carrying the HARQ-ACK is configured with a transmission with repetitions, and at least one symbol in all retransmissions of the PUCCH is configured by higher layer signaling and/or indicated by dynamic SFI as a downlink symbol and/or a flexible symbol.

Condition 8: the PUCCH carrying the HARQ-ACK is configured with a transmission with repetitions, and at least one symbol in at least one retransmission of the PUCCH is configured by higher layer signaling and/or indicated by dynamic SFI as a downlink symbol and/or a flexible symbol.

Condition 9: at least one symbol in a configured grant PUSCH carrying the HARQ-ACK is configured by higher layer signaling and/or indicated by dynamic SFI as a downlink symbol and/or a flexible symbol.

Condition 10: there is no HARQ-ACK information for dynamically scheduled PDSCH(s) and/or DCI(s) (PDCCH(s)) in the PUCCH time unit (for example, slot/sub-slot) where the HARQ-ACK is located. That is, the UE did not receive the dynamically scheduled PDSCH(s) and/or DCI(s) (PDCCH(s)) for which HARQ-ACK is transmitted in the PUCCH time unit (for example, slot/sub-slot).

Condition 11: the PUCCH time unit (for example, slot/sub-slot) carrying the HARQ-ACK does not overlap with the dynamically scheduled PUSCH(s) in time domain.

Condition 12: the PUSCH carrying the HARQ-ACK is one of the repetitive transmissions of a dynamically scheduled PUSCH (for example, scheduled by a DCI format), and at least one symbol in the PUSCH is configured by higher layer signaling and/or indicated by dynamic SFI as a downlink symbol. For example, the repetitive transmissions of the PUSCH may be a Type-A PUSCH transmission with repetitions defined by 3GPP TS 38.214.

Condition 13: the PUSCH carrying the HARQ-ACK is one but not the first repetitive transmission of a dynamically scheduled PUSCH (for example, scheduled by a DCI format), and at least one symbol in the PUSCH is configured by higher layer signaling and/or indicated by dynamic SFI as a downlink symbol. For example, the repetitive transmissions of the PUSCH(s) may be a Type-A PUSCH transmission with repetitions defined by 3GPP TS 38.214.

Condition 14: the PUSCH carrying the HARQ-ACK does not overlap with dynamically scheduled PUSCH(s) in time domain. For example, the PUSCH may be a PUSCH without repetitive transmissions. For another example, the PUSCH may be a PUSCH without transmissions with repetitions and/or the first repetitive transmission of the PUSCH with repetitive transmissions. For example, the repetitive transmissions of the PUSCH(s) may be a Type-A PUSCH transmission with repetitions defined by 3GPP TS 38.214.

Condition 15: there are no available uplink symbols in the PUCCH time unit (for example, slot/sub-slot) of the primary serving cell. For example, the UE is configured with only one serving cell.

Condition 16: there are no available uplink symbols in all configured serving cells. For example, all configured serving cells have no available uplink symbols in symbol(s) overlapping with the PUCCH carrying the HARQ-ACK. For another example, all configured serving cells have no available uplink symbols in symbol(s) overlapping with the PUCCH time unit where the PUCCH carrying the HARQ-ACK is located.

It should be noted that the available uplink symbols may be symbols configured by higher layer signaling and/or indicated by dynamic SFI as an uplink symbol and/or a flexible symbol. In the embodiments of the disclosure, that there is no available uplink symbols in a time unit may be understood as that symbols in the time unit are configured by higher layer signaling and/or indicated by dynamic SFI as downlink symbol and/or flexible symbols.

It should be noted that the symbol where SSB and/or CORESET0 are located can be regarded as the symbol configured as downlink by higher layer signaling (semi-static configuration). It should be noted that the PUCCH(s) carrying the HARQ-ACK may be PUCCH(s) carrying including only the HARQ-ACK and/or PUCCH(s) carrying the HARQ-ACK and other UCIs. For example, the PUCCH(s) carrying the HARQ-ACK may be determined according to the methods of other embodiments of the disclosure.

In some implementations, it can also be decided whether the UE satisfies a predefined Condition B through specification of protocols and/or configuration of higher layer signaling. For example, the predefined Condition B may be a condition for HARQ-ACK transmission cancellation. For example, the HARQ-ACK may be a HARQ-ACK codebook including HARQ-ACK information only for SPS PDSCH reception(s). If the predefined Condition B is satisfied, transmission of the HARQ-ACK is cancelled. For example, the predefined Condition B may be at least one of the following conditions. For another example, the predefined Condition B may be at least one of the following conditions and conditions defined in other embodiments.

Condition 17: the PUCCH(s) carrying the HARQ-ACK is configured with transmissions with repetitions, and at least one symbol in the transmissions with repetitions of the PUCCH(s) is configured by higher layer signaling and/or indicated by dynamic SFI as a downlink symbol and/or a flexible symbol.

Condition 18: at least one symbol in the configured grant PUSCH(s) carrying the HARQ-ACK is configured by higher layer signaling and/or indicated by dynamic SFI as a downlink symbol and/or a flexible symbol.

Condition 19: the HARQ-ACK is a HARQ-ACK with lower priority, and the PUCCH(s) and/or PUSCH(s) carrying the HARQ-ACK overlap with PUSCH(s) and/or PUSCH(s) with higher priority in time domain.

Condition 20: at least one symbol in the PUCCH(s) and/or PUSCH(s) carrying the HARQ-ACK is indicated as transmission cancellation by an Uplink Cancellation Indication (ULCI).

It should be noted that if the PUCCH(s) carrying the HARQ-ACK overlaps with the PUSCH(s) in time domain, the HARQ-ACK may be multiplexed in the PUSCH(s) through specification of protocols and/or configuration of higher layer signaling, and then it is decided whether the predefined Condition A and/or the predefined Condition B are satisfied. Alternatively, whether the predefined Condition A and/or the predefined Condition B are satisfied is directly decided without multiplexing the HARQ-ACK in the PUSCH(s).

The method provides a way for deciding the delayed transmission of HARQ-ACK, thus clarifying the behavior of the UE, keeping the understanding of the UE and the base station about whether to delay the transmission of HARQ-ACK consistent, and improving the reliability of HARQ-ACK transmission.

In some implementations, it may also be specified through protocols and/or configured through higher layer signaling (for example, through an RRC parameter) whether the PUSCH(s) carrying HARQ-ACK can be multiplexed with configured grant PUSCH(s). And if multiplexing is possible, HARQ-ACK is multiplexed in the PUSCH, and if multiplexing is not possible, the PUCCH(s) is transmitted but the PUSCH(s) is not transmitted. For example, the HARQ-ACK may include HARQ-ACK information for dynamically scheduled PDSCH(s) and/or DCI(s) (PDCCH(s)). For example, the RRC parameter may be configured separately for HARQ-ACK including dynamically scheduled PDSCH(s) and/or DCI(s) (PDCCH(s)) and HARQ-ACK including only SPS PDSCH(s). For another example, the RRC parameter may be uniformly configured for HARQ-ACK including dynamically scheduled PDSCH(s) and/or DCI(s) (PDCCH(s)) and HARQ-ACK including only SPS PDSCH(s). For example, the RRC parameter may be configured separately for different priorities (for example, physical layer priorities). For example, the RRC parameter may be uniformly configured for different priorities (for example, physical layer priorities). In some implementations, it may also be specified by protocols and/or configured by higher layer signaling, if the HARQ-ACK (for example, the HARQ-ACK may include HARQ-ACK information for dynamically scheduled PDSCH(s) and/or DCI(s) (PDCCH(s))) is multiplexed into a configured grant PUSCH, when deciding whether the PUSCH(s) conflicts with downlink symbols and/or flexible symbols, the PUSCH(s) is regarded as dynamically scheduled PUSCH(s). For example, if the PUSCH(s) conflicts with flexible symbols, the PUSCH(s) may be transmitted. For example, the UE does not expect the PUSCH(s) to conflict with downlink symbols. It should be noted that flexible symbols and/or downlink symbols may be configured by higher layer signaling and/or indicated by dynamic SFI.

The method improves the reliability of HARQ-ACK transmission, thus avoiding the situation where HARQ-ACK cannot be transmitted after being multiplexed on the configured grant PUSCH(s), and may reduce the retransmissions of downlink data, thereby improving the spectrum efficiency of the network.

The UE may receive some empty SPS PDSCH(s) because the configured period of a SPS PDSCH is different from the period of an actual service. It may be configured by higher layer signaling which SPS PDSCH reception(s) is empty or nonexistent in a SPS PDSCH configuration.

For example, a parameter indicating period and a parameter indicating bitmap may be configured in a SPS PDSCH configuration. For example, a period of a SPS PDSCH configuration is 1 slot, and the length of 1 slot is 1 millisecond. The period of a service is 1.25 milliseconds. In the SPS PDSCH configuration, a period P indicating empty SPS PDSCH(s) may be configured, for example, 5 slots. A bitmap may also be configured to indicate which SPS PDSCHs are empty and/or which SPS PDSCHs need to be received in the period P. For example, the bitmap may be 11110. 1 may indicate that the UE receives the corresponding SPS PDSCH(s), and 0 indicates that the UE does not receive the corresponding SPS PDSCH(s). Or 0 may indicate that the UE receives the corresponding SPS PDSCH(s), and 1 indicates that the UE does not receive the corresponding SPS PDSCH(s). For example, the SPS PDSCH reception indicated by the activation DCI corresponds to the first bit in the bitmap. Therefore, the UE may feed back HARQ-ACK information only for the SPS PDSCH(s) to be received.

For example, the period and time offset of the actual service may be configured in a SPS PDSCH configuration, and the UE determines which SPS PDSCHs to receive and/or which SPS PDSCHs not to receive according to predefined rules. Therefore, the UE may feedback HARQ-ACK information only for SPS PDSCH(s) determined to be received according to the predefined rules.

For example, a bitmap of a SPS PDSCH configuration may be indicated in a DCI format.

The method configures through signaling whether the UE receives SPS PDSCH(s), thus clarifying the behavior of the UE, reducing the decoding of SPS PDSCH(s) without data, and saving the energy consumption of the UE. The bit number of UCI is reduced, the PUCCH resources are saved, and the spectrum efficiency of the system is improved.

In some implementations, a PDSCH may be transmitted with repetitions, and SubCarrier Spacing (SCS) of a PDSCH and a PUCCH may be different. How to solve the uplink slot corresponding to the repetitive transmissions of PDSCH(s) is a problem to be solved, the following methods may be adopted.

For example, it may be specified by a protocol (for example, 3GPP TS 38.213) that, in a Type-1 HARQ-ACK codebook, if the UE is provided with a parameter indicating a PDSCH transmission with repetitions (for example, 3GPP parameter pdsch AggregationFactor), $$N_{PDSCH}^{repeat}$$

repeat is a value of the parameter indicating a PDSCH transmission with repetitions (for example, 3GPP parameter pdsch AggregationFactor); otherwise, $$N_{PDSCH}^{repeat} = 1.$$

The UE reports HARQ-ACK information for a PDSCH reception from slot $$n - N_{PDSCH}^{repeat} + 1$$

to slot n only in a HARQ-ACK codebook that the UE includes in a PUCCH or PUSCH transmission in slot n+k, where k is a number of slots indicated by the PDSCH-to-HARQ feedback timing indicator field in a corresponding DCI format or provided by dl-DataToUL-ACK if the PDSCH-to-HARQ feedback timing indicator field is not present in the DCI format. If the UE reports HARQ-ACK information for the PDSCH reception in a slot other than slot n+k, the UE sets a value for each corresponding HARQ-ACK information bit to NACK.

For example, it may be specified by a protocol (for example, 3GPP TS 38.213 R16) that, in a Type-1 HARQ-ACK codebook, the UE reports the HARQ-ACK information for a PDSCH reception—from the DL slot $$n_D - N_{PDSCH}^{repeat} + 1$$

to DL slot $n_D$ if $$N_{PDSCH}^{repeat}$$

repeat is provided by pdsch-AggregationFactor or pdsch-AggregationFactor-r16 (for example, determined according to the method of 3GPP TS 38.214), or from the DL slot $n_D$–repetitionNumber+1 to DL slot $n_D$, if the time domain resource assignment field in the DCI format scheduling the PDSCH reception indicates an entry containing repetitionNumber, or in DL slot $n_D$ otherwise only in a HARQ-ACK codebook that the UE includes in a PUCCH or PUSCH transmission in slot n+k, where n is a UL slot overlapping with the end of the PDSCH reception in DL slot $n_D$ and k is a number of slots indicated by the PDSCH-to-HARQ feedback timing indicator field in a corresponding DCI format or provided by dl-DataToUL-ACK if the PDSCH-to-HARQ feedback timing indicator field is not present in the DCI format. If the UE reports HARQ-ACK information for the PDSCH reception in a slot other than slot n+k, the UE sets a value for each corresponding HARQ-ACK information bit to NACK.

The method defines the timing relationship for feeding back HARQ-ACK information in the Type-1 HARQ-ACK codebook, thus clarifying the behavior of the UE, making the understanding of HARQ-ACK codebook by the UE and the base station consistent, improving the reliability of HARQ-ACK codebook, reducing the probability of PDSCH retransmission, and increasing the spectrum efficiency of the system.

According to an aspect of the disclosure, there is provided a method performed by a user equipment (UE) in a wireless communication system, including receiving downlink data and/or downlink control signaling from a base station; and transmitting uplink data and/or uplink control signaling to the base station based on the downlink data and/or downlink control signaling received from the base station.

Optionally, the step of transmitting uplink data and/or uplink control signaling to the base station based on the downlink data and/or downlink control signaling received from the base station includes: based on first indication information received from the base station, delaying transmission of hybrid automatic repeat request (HARQ)-positive acknowledgement (ACK) information for semi-persistent scheduling (SPS) physical downlink shared channel(s) (PDSCH(s)) to a next available uplink resource after an uplink resource expected for transmitting the HARQ-ACK information for the SPS PDSCH(s), wherein the first indication information is used to indicate whether the HARQ-ACK information for the SPS PDSCH(s) can be delayed, and wherein, the next available uplink resource is an uplink control channel (PUCCH) resource.

Optionally, the PUCCH resource is selected from at least one of the following lists: a first PUCCH resource list, which is a list of PUCCH resources configured by higher layer signaling for transmitting a HARQ-ACK codebook including HARQ-ACK information only for SPS PDSCH reception(s); a second PUCCH resource list, which is a list of PUCCH resources configured by higher layer signaling for transmitting a HARQ-ACK codebook including HARQ-ACK information for dynamically scheduled PDSCH(s); and a third PUCCH resource list, which is a list of PUCCH resources dedicated for transmitting a HARQ-ACK codebook including HARQ-ACK information only for SPS PDSCH reception(s).

Optionally, the first PUCCH resource list, the second PUCCH resource list, and the third PUCCH resource list include PUCCH resources with the same priority, and wherein, the PUCCH resources with the same priority have the same priority as that of a HARQ-ACK codebook composed of HARQ-ACK information for the SPS PDSCH(s).

Optionally, the first PUCCH resource list, the second PUCCH resource list, and the third PUCCH resource list include PUCCH resources with multiple priorities, and the method further includes: when PUCCH resources with the same priority as that of the HARQ-ACK codebook composed of HARQ-ACK information for the SPS PDSCH(s) are included in the PUCCH resources with multiple priorities, selecting a PUCCH resource among the PUCCH resources with the same priority as the next available uplink resource; otherwise, selecting a PUCCH resource with another priority among the PUCCH resources with multiple priorities as the next available uplink resource.

Optionally, when the PUCCH resource is selected from the second PUCCH resource list, the PUCCH resource satisfies at least one of the following conditions: Condition 1: the PUCCH resource does not overlap with a set of downlink symbols and/or flexible symbols configured by higher layer signaling and/or indicated by downlink control information (DCI), and Condition 2: the PUCCH resource is a PUCCH resource of a set of PUCCH resources determined based on a number of bits for the HARQ-ACK codebook composed of HARQ-ACK information for the SPS PDSCH(s).

Optionally, when the set of PUCCH resources determined based on the number of bits for the HARQ-ACK codebook composed of HARQ-ACK information for the SPS PDSCH(s) includes a plurality of PUCCH resources, a PUCCH resource is selected from the plurality of PUCCH resources according to a predefined rule from the set of PUCCH resources, wherein, the predefined rule is: being with a smallest starting symbol index, being with an earliest starting position, being with a smallest ending symbol index, or being with an earliest ending position.

Optionally, when the PUCCH resource is selected from a combination of two or three of the first PUCCH resource list, the second PUCCH resource list and the third PUCCH resource list, PUCCH resource lists in the combination are assigned priority orders, and the PUCCH resource is selected according to the priority orders.

Optionally, when the PUCCH resource is selected from the third PUCCH resource list, the PUCCH resource is a PUCCH resource of a set of PUCCH resources determined based on a number of bits for the HARQ-ACK codebook composed of HARQ-ACK information for the SPS PDSCH(s).

Optionally, the next available uplink resource is an uplink shared channel PUSCH resource.

Optionally, when an uplink time unit where the next available uplink resource is located does not include any available uplink control channel PUCCH resource, the next available uplink resource is an uplink shared channel PUSCH resource.

Optionally, the PUSCH resource is selected from at least one of the followings: a first PUSCH resource list, which is a list of dynamically scheduled PUSCH resources; a second PUSCH resource list, which is a list of configured grant PUSCH resources; and a third PUSCH resource list, which is a list of PUSCH resources dedicated for transmitting a HARQ-ACK codebook including HARQ-ACK information only for SPS PDSCH reception(s).

Optionally, the transmitting uplink data and/or uplink control signaling to the base station based on the downlink data and/or downlink control signaling received from the base station includes: based on a period and a bitmap of a SPS PDSCH configuration received from the base station, determining HARQ-ACK information for the received SPS PDSCH(s).

Optionally, at least one of the period and bitmap of the SPS PDSCH configuration is included in downlink control information (DCI).

According to another aspect of the disclosure, there is provided a user equipment (UE) in a wireless communication system, including a transceiver configured to transmit and receive signals; and a controller configured to control the transceiver to perform: receiving downlink data and/or downlink control signaling from a base station; and transmitting uplink data and/or uplink control signaling to the base station based on the downlink data and/or downlink control signaling received from the base station.

According to another aspect of the disclosure, there is provided a method performed by a base station in a wireless communication system, including: transmitting downlink data and/or downlink control signaling to a UE; and receiving, from the UE, uplink data and/or uplink control signaling transmitted by the UE based on the downlink data and/or downlink control signaling received from the base station.

According to another aspect of the disclosure, there is provided a base station in a wireless communication system, including a transceiver configured to transmit and receive signals; and a controller configured to control the transceiver to perform: transmitting downlink data and/or downlink control signaling to a UE; and receiving, from the UE, uplink data and/or uplink control signaling transmitted by the UE based on the downlink data and/or downlink control signaling received from the base station.

FIG. 6 illustrates a structure of a user equipment (UE) according to an embodiment of the disclosure.

Referring to FIG. 6, the UE 600 may include a controller 610, a transceiver 620, and a memory 630. However, all of the illustrated components are not essential. The UE 600 may be implemented by more or less components than those illustrated in FIG. 6. In addition, the controller 610 and the transceiver 620 and the memory 630 may be implemented as a single chip according to another embodiment.

The UE 600 may correspond to the UE described above.

The aforementioned components will now be described in detail.

The controller 610 may include one or more processors or other processing devices that control the proposed function, process, and/or method. Operation of the UE 600 may be implemented by the controller 610.

The transceiver 620 may include an RF transmitter for up-converting and amplifying a transmitted signal, and an RF receiver for down-converting a frequency of a received signal. However, according to another embodiment, the transceiver 620 may be implemented by more or less components than those illustrated in components.

The transceiver 620 may be connected to the controller 610 and transmit and/or receive a signal. The signal may include control information and data. In addition, the transceiver 620 may receive the signal through a wireless channel and output the signal to the controller 610. The transceiver 620 may transmit a signal output from the controller 610 through the wireless channel.

The memory 630 may store the control information or the data included in a signal obtained by the UE 600. The memory 630 may be connected to the controller 620 and store at least one instruction or a protocol or a parameter for the proposed function, process, and/or method. The memory 630 may include read-only memory (ROM) and/or random access memory (RAM) and/or hard disk and/or CD-ROM and/or DVD and/or other storage devices.

FIG. 7 illustrates a structure of a base station according to an embodiment of the disclosure.

Referring to FIG. 7, the base station 700 may include a controller 710, a transceiver 720, and a memory 730. However, all of the illustrated components are not essential. The base station 700 may be implemented by more or less components than those illustrated in FIG. 7. In addition, the controller 710 and the transceiver 720 and the memory 730 may be implemented as a single chip according to another embodiment.

The base station 700 may correspond to the base station described in the disclosure.

The aforementioned components will now be described in detail.

The controller 710 may include one or more processors or other processing devices that control the proposed function, process, and/or method. Operation of the base station 700 may be implemented by the controller 710.

The transceiver 720 may include an RF transmitter for up-converting and amplifying a transmitted signal, and an RF receiver for down-converting a frequency of a received signal. However, according to another embodiment, the transceiver 720 may be implemented by more or less components than those illustrated in components.

The transceiver 720 may be connected to the controller 710 and transmit and/or receive a signal. The signal may include control information and data. In addition, the transceiver 720 may receive the signal through a wireless channel and output the signal to the controller 710. The transceiver 720 may transmit a signal output from the controller 710 through the wireless channel.

The memory 730 may store the control information or the data included in a signal obtained by the base station 700. The memory 730 may be connected to the controller 710 and store at least one instruction or a protocol or a parameter for the proposed function, process, and/or method. The memory 730 may include read-only memory (ROM) and/or random access memory (RAM) and/or hard disk and/or CD-ROM and/or DVD and/or other storage devices.

Those skilled in the art will understand that the above illustrative embodiments are described herein and are not intended to be limiting. It should be understood that any two or more of the embodiments disclosed herein may be combined in any combination. Furthermore, other embodiments may be utilized and other changes may be made without departing from the spirit and scope of the subject matter presented herein. It will be readily understood that aspects of the invention of the disclosure as generally described herein and shown in the drawings may be arranged, replaced, combined, separated and designed in various different configurations, all of which are contemplated herein.

Those skilled in the art will understand that the various illustrative logical blocks, modules, circuits, and steps described in this application may be implemented as hardware, software, or a combination of both. To clearly illustrate this inter-changeability between hardware and software, various illustrative components, blocks, modules, circuits, and steps are generally described above in the form of their functional sets. Whether such function sets are implemented as hardware or software depends on the specific application and the design constraints imposed on the overall system. Those skilled may implement the described function sets in different ways for each specific application, but such design decisions should not be interpreted as causing a departure from the scope of this application.

The various illustrative logic blocks, modules, and circuits described in this application may be implemented by a general purpose processor, a Digital Signal Processor (DSP), an Application Specific Integrated Circuit (ASIC), a Field Programmable Gate Array (FPGA) or other programmable logic devices, discrete gates or transistor logics, discrete hardware components, or any combination thereof designed to perform the functions described herein. The general purpose processor may be a microprocessor, but in an alternative, the processor may be any conventional processor, controller, microcontroller, or state machine. The processor may also be implemented as a combination of computing devices, such as a combination of a DSP and a microprocessor, a plurality of microprocessors, one or more microprocessors cooperating with a DSP core, or any other such configuration.

The steps of the method or algorithm described in this application may be embodied directly in hardware, in a software module executed by a processor, or in a combination of both. The software module may reside in a RAM memory, flash memory, ROM memory, EPROM memory, EEPROM memory, register, hard disk, removable disk, or any other form of storage medium known in the art. An exemplary storage medium is coupled to a processor to enable the processor to read and write information from/to the storage medium. In an alternative, the storage medium may be integrated into the processor. The processor and the storage medium may reside in the ASIC. The ASIC may reside in the user terminal. In an alternative, the processor and the storage medium may reside in the user terminal as discrete components.

In one or more exemplary designs, the functions may be implemented in hardware, software, firmware, or any combination thereof. If implemented in software, each function may be stored as one or more instructions or codes on a computer-readable medium or transferred by it. Computer-readable media include both computer storage media and communication media, the latter including any media that facilitates the transfer of computer programs from one place to another. A storage medium may be any available medium that can be accessed by a general purpose or special purpose computer.

The above is only exemplary implementations of the disclosure, and is not intended to limit the scope of protection of the disclosure, which is determined by the appended claims.

The invention claimed is:

1. A method performed by a user equipment (UE) in a communication system, the method comprising:

receiving, from a base station, semi-persistent scheduling (SPS) configuration information via radio resource control (RRC) signaling, the SPS configuration information including information associated with deferral of a transmission of hybrid automatic repeat request-acknowledgement (HARQ-ACK) information bits for SPS physical downlink shared channels (PDSCHs);

identifying a first physical uplink control channel (PUCCH) resource for a transmission of first HARQ-ACK information bits for SPS PDSCHs in a first slot;

in case that the first PUCCH resource overlaps with a symbol indicated as downlink, determining a second slot associated with a transmission of at least one HARQ-ACK information bit from the first HARQ-ACK information bits;

determining third HARQ-ACK information bits by appending the at least one HARQ-ACK information bit to second HARQ-ACK information bits; and transmitting, to the base station, the third HARQ-ACK information bits on a PUCCH or a physical uplink shared channel (PUSCH) in the second slot.

2. The method of claim 1, wherein the symbol indicated as downlink includes at least one of:

a downlink symbol configured by a time division duplex (TDD) uplink (UL)-downlink (DL) common configuration or a TDD UL-DL dedicated configuration, a symbol corresponding to a synchronization signal block (SSB), or a symbol corresponding to a control resource set 0 (CORESET 0).

3. The method of claim 1, wherein a maximum time interval for deferring the transmission of the first HARQ-ACK information bits for SPS PDSCHs is identified based on the SPS configuration information.

4. The method of claim 1, wherein, in case that the UE receives a PDSCH for a same HARQ process of as a HARQ-ACK information bit from the first HARQ-ACK information bits before the transmission of the PUCCH or the PUSCH, the HARQ-ACK information bit is excluded from the third HARQ-ACK information bits.

5. The method of claim 1, wherein the first PUCCH resource is identified after resolving overlapping among PUCCHs and PUSCHs in the first slot.

6. A method performed by a base station in a communication system, the method comprising:

transmitting, to a user equipment (UE), semi-persistent scheduling (SPS) configuration information via radio resource control (RRC) signaling, the SPS configuration information including information associated with deferral of a transmission of hybrid automatic repeat request-acknowledgement (HARQ-ACK) information bits for SPS physical downlink shared channels (PD-SCHs); and receiving, from the UE, third HARQ-ACK information bits on a physical uplink control channel (PUCCH) or a physical uplink shared channel (PUSCH) in a second slot, wherein, in case that a first PUCCH resource for a transmission of first HARQ-ACK information bits for SPS PDSCHs in a first slot overlaps with a symbol indicated as downlink, at least one HARQ-ACK information bit from the first HARQ-ACK information bits is received in the second slot, and wherein the third HARQ-ACK information bits are determined by appending the at least one HARQ-ACK information bit to second HARQ-ACK information bits.

7. The method of claim 6, wherein the symbol indicated as downlink includes at least one of:

a downlink symbol configured by a time division duplex (TDD) uplink (UL)-downlink (DL) common configuration or a TDD UL-DL dedicated configuration, a symbol corresponding to a synchronization signal block (SSB), or a symbol corresponding to a control resource set 0 (CORESET 0).

8. The method of claim 6, wherein a maximum time interval for deferring the transmission of the first HARQ-ACK information bits for SPS PDSCHs is configured based on the SPS configuration information, and wherein the first PUCCH resource is identified after resolving overlapping among PUCCHs and PUSCHs in the first slot.

9. The method of claim 6, wherein, in case that the base station transmits a PDSCH for a same HARQ process as a HARQ-ACK information bit from the first HARQ-ACK information bits before the reception of the PUCCH or the PUSCH, the HARQ-ACK information bit is excluded from the third HARQ-ACK information bits.

10. A user equipment (UE) in a communication system, the UE comprising:

a transceiver; and a controller configured to:

receive, from a base station via the transceiver, semi-persistent scheduling (SPS) configuration information via radio resource control (RRC) signaling, the SPS configuration information including information associated with deferral of a transmission of first hybrid automatic repeat request-acknowledgement (HARQ-ACK) information bits for SPS physical downlink shared channels (PDSCHs), identify a first physical uplink control channel (PUCCH) resource for a transmission of the first HARQ-ACK information bits for SPS PDSCHs in a first slot, in case that the first PUCCH resource overlaps with a symbol indicated as downlink, determine a second slot associated with a transmission of at least one HARQ-ACK information bit from the first HARQ-ACK information bits, determine third HARQ-ACK information bits by appending the at least one HARQ-ACK information bit to second HARQ-ACK information bits, and transmit, to the base station via the transceiver, the third HARQ-ACK information bits on a PUCCH or a physical uplink shared channel (PUSCH) in the second slot.

11. The UE of claim 10, wherein the symbol indicated as downlink includes at least one of:

a downlink symbol configured by a time division duplex (TDD) uplink (UL)-downlink (DL) common configuration or a TDD UL-DL dedicated configuration, a symbol corresponding to a synchronization signal block (SSB), or a symbol corresponding to a control resource set 0 (CORESET 0).

12. The UE of claim 10, wherein a maximum time interval for deferring the transmission of the first HARQ-ACK information bits for SPS PDSCHs is identified based on the SPS configuration information.

13. The UE of claim 10, wherein, in case that the UE receives a PDSCH for a same HARQ process as a HARQ-ACK information bit from the first HARQ-ACK information bits before the transmission of the PUCCH or the PUSCH, the HARQ-ACK information bit is excluded from the third HARQ-ACK information bits.

14. A base station in a communication system, the base station comprising:

a transceiver; and a controller configured to:

transmit, to a user equipment (UE) via the transceiver, semi-persistent scheduling (SPS) configuration information via radio resource control (RRC) signaling, the SPS configuration information including information associated with deferral of a transmission of hybrid automatic repeat request-acknowledgement (HARQ-ACK) information bits for SPS physical downlink shared channels (PDSCHs), and receive, from the UE via the transceiver, third HARQ-ACK information bits on a physical uplink control channel (PUCCH) or a physical uplink shared channel (PUSCH) in a second slot, wherein, in case that a first PUCCH resource for a transmission of first HARQ-ACK information bits for SPS PDSCHs in a first slot overlaps with a symbol indicated as downlink, at least one HARQ-ACK information bit from the first HARQ-ACK information bits is received in the second slot, and wherein the third HARQ-ACK information bits are determined by appending the at least one HARQ-ACK information bit to second HARQ-ACK information bits.

15. The base station of claim 14, wherein the symbol indicated as downlink includes at least one of:

a downlink symbol configured by a time division duplex (TDD) uplink (UL)-downlink (DL) common configuration or a TDD UL-DL dedicated configuration, a symbol corresponding to a synchronization signal block (SSB), or a symbol corresponding to a control resource set 0 (CORESET 0), wherein a maximum time interval for deferring the transmission of the first HARQ-ACK information bits for SPS PDSCHs is configured based on the SPS configuration information, and wherein the first PUCCH resource is identified after resolving overlapping among PUCCHs and PUSCHs in the first slot.

16. The base station of claim 14, wherein, in case that the base station transmits a PDSCH for a same HARQ process as a HARQ-ACK information bit from the first HARQ-ACK information bits before the reception of the PUCCH or the PUSCH, the HARQ-ACK information bit is excluded from the third HARQ-ACK information bits.

\* \* \* \* \*